(12) United States Patent
Park et al.

(10) Patent No.: US 7,586,836 B2
(45) Date of Patent: *Sep. 8, 2009

(54) APPARATUS AND METHOD FOR TRANSMITTING/RECEIVING PILOT SIGNALS IN A COMMUNICATION SYSTEM USING AN ORTHOGONAL FREQUENCY DIVISION MULTIPLEXING SCHEME

(75) Inventors: Sung-Eun Park, Suwon-si (KR); Seung-Hoon Choi, Suwon-si (KR); Dong-Seek Park, Yongin-si (KR); Jae-Yoel Kim, Gunpo-si (KR); Ji-Ho Jang, Seoul (KR); Pan-Yuh Joo, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 684 days.

This patent is subject to a terminal disclaimer.

(21) Appl. No.: 11/165,719

(22) Filed: Jun. 24, 2005

(65) Prior Publication Data
US 2006/0018251 A1  Jan. 26, 2006

(30) Foreign Application Priority Data
Jun. 25, 2004 (KR) .................... 10-2004-0048249
Aug. 26, 2004 (KR) .................... 10-2004-0067648

(51) Int. Cl.
H04J 11/00 (2006.01)
(52) U.S. Cl. .................. 370/209; 370/210; 370/335
(58) Field of Classification Search ............. 370/203, 370/208–209, 335, 342, 480, 491–492
See application file for complete search history.

(56) References Cited

U.S. PATENT DOCUMENTS

| | | | | |
|---|---|---|---|---|
| 5,577,025 A | * | 11/1996 | Skinner et al. ............. | 370/209 |
| 5,757,767 A | * | 5/1998 | Zehavi ...................... | 370/208 |
| 6,567,374 B1 | | 5/2003 | Bohnke et al. | |
| 6,611,551 B1 | | 8/2003 | Jones, IV et al. | |
| 6,854,082 B1 | * | 2/2005 | Rhee ........................ | 714/755 |
| 6,928,084 B2 | * | 8/2005 | Cimini et al. .............. | 370/430 |
| 2004/0085892 A1 | * | 5/2004 | Walton et al. .............. | 370/208 |
| 2004/0109405 A1 | * | 6/2004 | Suh et al. .................. | 370/208 |
| 2004/0131007 A1 | * | 7/2004 | Smee et al. ................ | 370/208 |
| 2005/0281354 A1 | * | 12/2005 | Kim ......................... | 375/299 |

FOREIGN PATENT DOCUMENTS

| | | |
|---|---|---|
| EP | 1 401 133 | 3/2004 |
| EP | 1 571 796 | 9/2005 |
| KR | 10-2000-0042359 | 7/2000 |
| RU | 2 186 465 | 8/2000 |
| RU | 2 208 911 | 5/2001 |

OTHER PUBLICATIONS

Peak-to-Average Rower Ratio Reduction of an OFDM Signal using Partial Transmit Sequence. Cimini, Jr et al. IEEE, Communication letters, 1999.*

(Continued)

*Primary Examiner*—Ian N Moore
*Assistant Examiner*—Jose Villa
(74) *Attorney, Agent, or Firm*—The Farrell Law Firm, LLP

(57) ABSTRACT

Disclosed is a method for providing a pilot symbol for base station identification in a Multiple-Input Multiple-Output (MIMO) communication system having one or more transmission antennas, wherein the pilot symbol is comprised of a first sequence having a good cell identification characteristic and a second sequence for reducing a peak-to-average power ratio (PAPR) for all of pilot symbols.

21 Claims, 9 Drawing Sheets

OTHER PUBLICATIONS

Peak-to-Average Rower Ratio in MIMO-OFDM System using Selective Mapping. Lee et al. IEEE, Communication letters, vol. 7, No. 12 Dec. 2003.*

Richard D.J. van Nee, "OFDM Codes for Peak-to-Average Power Reduction and Error Correction", Nov. 18, 1996.

Motohiro Tanno et al., "Three-Step Fast Cell Search Algorithm Utilizing Common Pilot Channel for OFCDM Broadband Packet Wireless Access", Sep. 24, 2002.

* cited by examiner

APPARATUS AND METHOD FOR TRANSMITTING/RECEIVING PILOT SIGNALS IN A COMMUNICATION SYSTEM USING AN ORTHOGONAL FREQUENCY DIVISION MULTIPLEXING SCHEME

PRIORITY

This application claims priority under 35 U.S.C. § 119 to an application entitled "Apparatus and Method for Transmitting/Receiving Pilot Signals in a Communication System Using Orthogonal Frequency Division Multiplexing Scheme" filed in the Korean Intellectual Property Office on Jun. 25, 2004 and assigned Serial No. 2004-48249, and an application entitled "Apparatus and Method for Transmitting/Receiving Pilot Signals in a Communication System Using Orthogonal Frequency Division Multiplexing Scheme" filed in the Korean Intellectual Property Office on Aug. 26, 2004 and assigned Serial No. 2004-67648, the contents of both of which are incorporated herein by reference.

BACKGROUND OF THE INVENTION

1. Field of the Invention

The present invention relates generally to a communication system using an Orthogonal Frequency Division Multiplexing (OFDM) scheme, and in particular, to an apparatus and method for transmitting/receiving pilot signals used for distinguishing base stations and sectors.

2. Description of the Related Art

Extensive research is being conducted in the $4^{th}$ generation (4G) communication system, which is the next generation communication system, to provide users with services having various Qualities-of-Service (QoSs) at high data rates. Particularly, a study of the 4G communication system is being performed to provide a high-speed service capable of supporting the mobility and QoS in a Broadband Wireless Access (BWA) communication system such as a wireless Local Area Network (LAN) system and a wireless Metropolitan Area Network (MAN) system.

In the 4G communication system, a study of an OFDM scheme is being conducted as an appropriate scheme for high-speed data transmission in a wire/wireless channel. The OFDM scheme, a typical scheme for transmitting data using multiple carriers, is based on a Multi-Carrier Modulation (MCM) scheme for parallel-converting a serial input symbol stream and modulating each of the symbols with the multiple orthogonal subcarriers before transmission.

In order to provide a high-speed, high-quality wireless multimedia service, the 4G communication system requires broadband spectrum resources. The use of the broadband spectrum resources considerably increases a fading effect in a wireless transmission path due to multipath propagation and causes a frequency-selective fading effect in the transmission frequency band. For the high-speed wireless multimedia service, the OFDM scheme, which is robust against frequency selective fading, tends to be more popularly used in the 4G communication system, as it has a higher gain then a Code Division Multiple Access (CDMA) scheme.

The operations of a transmitter and a receiver for a communication system using the OFDM scheme ("OFDM communication system") will now be described.

In the transmitter of the OFDM communication system, input data is modulated with subcarriers through a scrambler, an encoder and an interleaver. The transmitter provides a variable data rate, and operates at different coding rates, interleaving sizes and modulation schemes depending on the data rate. Commonly, the encoder uses a coding rate of ½ or ¾, and a size of the interleaver for preventing a burst error is determined according to the Number of Coded Bits per Symbol (NCBPS). The transmitter uses one of a Quadrature Phase Shift Keying (QPSK) scheme, an 8-ary Phase Shift Keying (8PSK) scheme, a 16-ary Quadrature Amplitude Modulation (16QAM) scheme and a 64-ary Quadrature Amplitude Modulation (64QAM) scheme as the modulation scheme according to the data rate.

A predetermined number of pilot subcarrier signals are added to the signals modulated by the above elements with a predetermined number of subcarrier signals, and generated into one OFDM symbol through an inverse fast Fourier transform (IFFT) operation in an IFFT block. A guard interval signal for removing inter-symbol interference in a multipath channel environment is inserted into the OFDM symbol, and then is finally input to a radio frequency (RF) processor through a symbol generator. The RF processor RF-processes an input signal and transmits the RF signal.

The guard interval signal is inserted to prevent inter-symbol interference between an OFDM symbol transmitted at a previous OFDM symbol time and an OFDM symbol transmitted at a current OFDM symbol time. The guard interval is inserted with one of a 'Cyclic Prefix' method and a 'Cyclic Postfix' method. The Cyclic Prefix method copies a predetermined number of last samples of a time-domain OFDM symbol and inserts the copied samples into an effective OFDM symbol, and the Cyclic Postfix method copies a predetermined number of first samples of a time-domain OFDM symbol and inserts the copied samples into an effective OFDM symbol.

In the receiver of the OFDM communication system, a reverse process for the process performed in the transmitter is performed. A synchronization process is also performed in the receiver. For a received OFDM symbol, a process of estimating a frequency offset and a symbol offset using a predetermined training symbol must be performed. A guard interval-removed data symbol is restored into the subcarrier signals to which pilot subcarrier signals are added, through a fast Fourier transform (FFT) block.

In order to overcome a path delay phenomenon in an actual radio channel, an equalizer estimates channel conditions for a received channel signal, and removes signal distortion in the actual radio channel from the received channel signal. The data channel-estimated through the equalizer is converted into a bit stream, and the bit stream is deinterleaved by a deinterleaver, and then, output as final data through a decoder and a descrambler.

In the OFDM communication system, the transmitter, or a base station (BS), transmits pilot subcarrier signals to the receiver, or a mobile station (MS). The base station simultaneously transmits data subcarrier signals together with the pilot subcarrier signals. The reason for transmitting the pilot subcarrier signals is for synchronization acquisition, channel estimation, and base station identification. The points where the pilot subcarrier signals are transmitted are predefined between the transmitter and the receiver. As a result, the pilot subcarrier signals serve as reference signals.

A description will now be made of an operation in which a mobile station identifies its base station using the pilot subcarrier signals.

A base station transmits the pilot subcarrier signals such that they can arrive up to a cell boundary with the transmission power which is relatively higher than that of the data subcarrier signals, using a specific pilot pattern, for the following reasons. Upon its entry into a cell, the mobile station has no information on its current base station to which the mobile station currently belongs. In order to detect its current base station, the mobile station should use only the pilot subcarrier signals. The base station transmits the pilot subcarrier signals in such a manner that it transmits the pilot subcarrier signals using a particular pilot pattern so that the mobile station can detect its current base station.

The pilot pattern refers to a pattern generated by the pilot subcarrier signals that a base station transmits. That is, the pilot pattern is determined depending on a slope of the pilot subcarrier signals and a start point at which transmission of the pilot subcarrier signals starts. The OFDM communication system should be designed such that base stations included in the OFDM communication system have different pilot patterns for identification purposes. The pilot pattern is generated by considering a coherence bandwidth and a coherence time. The coherence bandwidth represents the maximum bandwidth at which it can be assumed that a channel is flat (remains unchanged) in a frequency domain. The coherence time represents the maximum time for which it can be assumed that a channel is flat (remains unchanged) in a time domain. Because it can be assumed that channels are flat in the coherence bandwidth and the coherence time, sync acquisition, channel estimation and base station identification can be achieved by simply transmitting one pilot subcarrier signal over the coherence bandwidth for the coherence time.

The transmission of only one pilot subcarrier signal can maximize transmission of data subcarrier signals, which in turn contributes to the entire system performance. The maximum frequency band over which the pilot subcarrier signals are transmitted is referred to the coherence bandwidth, and the maximum time band, i.e. the maximum OFDM symbol time band, for which the pilot subcarrier signals are transmitted, is referred to the coherence time.

Although the number of base stations included in the OFDM communication system is subject to change according to the size of the OFDM communication system, as a general rule the number of the base stations increases with the size of the OFDM communication system. For identification of the base stations, the number of pilot patterns, having different slopes and different start points, should be equal to the number of the base stations. However, the OFDM communication system should take the coherence bandwidth and the coherence time into consideration when transmitting pilot subcarrier signals in a time-frequency domain, and the pilot patterns having different slopes and different start points, generated taking into consideration the coherence bandwidth and the coherence time, are limited. When the pilot patterns are generated without having any consideration of the coherence bandwidth and the coherence time, pilot subcarrier signals representing different base stations coexist in the pilot patterns. In this case, it is impossible to identify base stations using the pilot patterns.

FIG. 1 is a diagram illustrating transmission points of pilot subcarriers based on a pilot pattern in a conventional OFDM communication system in which only one pilot subchannel is used. Referring to FIG. 1, possible slopes to use for the generation of the pilot patterns and the number thereof, i.e. possible slopes to use for the transmission of the pilot subcarrier signals and the number thereof are limited according to a coherence bandwidth 100 and a coherence time 110. If it is assumed in FIG. 1 that when the coherence bandwidth 100 is 6 and the coherence time 110 is 1, the number of slopes that can be used for pilot patterns is an integer, then the possible slopes for pilot patterns in this condition include 6 slopes of s=0 (101) to s=5 (106). That is, each of the possible slopes for pilot patterns in this condition is one of the integers inclusive of 0 to 5.

The number of possible slopes for pilot patterns being 6 means that the number of base stations that can be distinguished using the pilot patterns in the OFDM communication system is 6. In FIG. 1, an oblique-lined circle 107 represents a pilot subcarrier signal spaced apart by the coherence bandwidth 100. In conclusion, the slopes for pilot patterns are limited by the coherence bandwidth 100.

Because generation of the pilot patterns used for identifying base stations included in the OFDM communication system is limited by the coherence bandwidth and the coherence time, the possible number of pilot patterns is also limited. If the number of base stations included in the OFDM communication system increases, the number of distinguishable base stations is limited due to the limitation in the possible number of the pilot patterns.

SUMMARY OF THE INVENTION

It is, therefore, an object of the present invention to provide an apparatus and method for transmitting/receiving pilot signals used for base station and sector identification in an OFDM communication system.

It is another object of the present invention to provide an apparatus and method for transmitting/receiving pilot signals with minimized interference therebetween in an OFDM communication system.

It is further another object of the present invention to provide an apparatus and method for transmitting/receiving pilot signals having a variable length in an OFDM communication system.

It is yet another object of the present invention to provide an apparatus and method for transmitting/receiving pilot signals using block codes in an OFDM communication system.

It is still another object of the present invention to provide an apparatus and method for transmitting/receiving pilot signals used for base station identification through one or more antennas in an OFDM communication system.

To achieve the above and other objects, there is provided a method for transmitting a reference signal to identify a cell and a sector through at least one transmission antenna in a communication system including a plurality of cells each having at least one sector and at least one transmission antenna. The method includes the steps of generating a first-part sequence using a block code and a Walsh code based on a cell identifier (ID) and a sector ID, upon receiving the cell ID and the sector ID, wherein each of the plurality of cells is distinguished by its unique cell ID and each of the sectors is distinguished by its unique sector ID; selecting a second-part sequence based on the cell ID and the sector ID from among predetermined a set of sequences; generating a frequency-domain reference signal using the first-part sequence and the second-part sequence; and converting the frequency-domain reference signal into a time-domain reference signal through inverse fast Fourier transform (IFFT), and transmitting the time-domain reference signal over a reference signal transmission period.

To achieve the above and other objects, there is provided a method for transmitting a reference signal to identify a cell and a sector through at least one transmission antenna in a communication system including a plurality of cells each having at least one sector and at least one transmission antenna, wherein a full frequency band is divided into N subcarrier bands. The method includes the steps of generating a block code corresponding to a cell identifier (ID) upon receiving the cell ID, wherein each of the plurality of cells is distinguished by its unique cell ID; selecting a Walsh code corresponding to a sector ID from among predetermined Walsh codes upon receiving the sector ID and repeating the selected Walsh code a set number of times, wherein each of the sectors is distinguished by its unique sector ID; interleaving the block code, and generating a first-part sequence by performing an exclusive OR (XOR) operation on the interleaved block code and the repeated Walsh code; selecting a second-part sequence corresponding to the cell ID and the sector ID from among predetermined sequences; generating a frequency-domain reference signal using the first-part sequence and the second-part sequence; and converting the frequency-domain reference signal into a time-domain reference signal through inverse fast Fourier transform (IFFT), and transmitting the time-domain reference signal over a reference signal transmission period.

To achieve the above and other objects, there is provided an apparatus for transmitting a reference signal to identify a cell and a sector through at least one transmission antenna in a communication system including a plurality of cells each having at least one sector and at least one transmission antenna, wherein a full frequency band is divided into N subcarrier bands. The apparatus includes a reference signal generator for generating a first-part sequence using a block code and a Walsh code based on a cell identifier (ID) and a sector ID upon receiving the cell ID and the sector ID, wherein each of the plurality of cells is distinguished by its unique cell ID and each of the sectors is distinguished by its unique sector ID, and generating a frequency-domain reference signal using the first-part sequence and a second-part sequence selected according to the cell ID and the sector ID from among predetermined sequences; and a transmitter for converting the frequency-domain reference signal into a time-domain reference signal through inverse fast Fourier transform (IFFT), and transmitting the time-domain reference signal over a reference signal transmission period.

To achieve the above and other objects, there is provided an apparatus for transmitting a reference signal to identify a cell and a sector through at least one transmission antenna in a communication system including a plurality of cells each having at least one sector and at least one transmission antenna, wherein a full frequency band is divided into N subcarrier bands. The apparatus includes a block code encoder for generating a block code corresponding to a cell identifier (ID) upon receiving the cell ID, wherein each of the plurality of cells is distinguished by its unique cell ID; a Walsh code repeater for selecting a Walsh code corresponding to a sector ID from among predetermined Walsh codes upon receiving the sector ID and repeating the selected Walsh code a predetermined number of times, wherein each of the sectors is distinguished by its unique sector ID; an interleaver for interleaving the block code; an adder for generating a first-part sequence by performing an exclusive OR (XOR) operation on the interleaved block code and the repeated Walsh code; a combiner for generating a frequency-domain reference signal using the first-part sequence and a second-part sequence selected according to the cell ID and the sector ID from among predetermined sequences; and a transmitter for converting the frequency-domain reference signal into a time-domain reference signal through inverse fast Fourier transform (IFFT), and transmitting the time-domain reference signal over a reference signal transmission period.

To achieve the above and other objects, there is provided a method for providing a pilot symbol for base station identification in a Multiple-Input Mulitple-Output (MIMO) communication system having one or more transmission antennas, wherein the pilot symbol is comprised of a first sequence having a good cell identification characteristic and a second sequence for reducing a peak-to-average power ratio (PAPR) for all of pilot symbols.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness.

The present invention proposes a scheme for transmitting/receiving pilot signals for base station (BS) and sector identification through one or more antennas in a communication system using an Orthogonal Frequency Division Multiplexing (OFDM) scheme ("OFDM communication system"). In particular, the present invention proposes a scheme for transmitting/receiving, through one or more antennas, pilot signals with minimized interference therebetween securing the base station and sector identification in the OFDM communication system.

Figure 1:
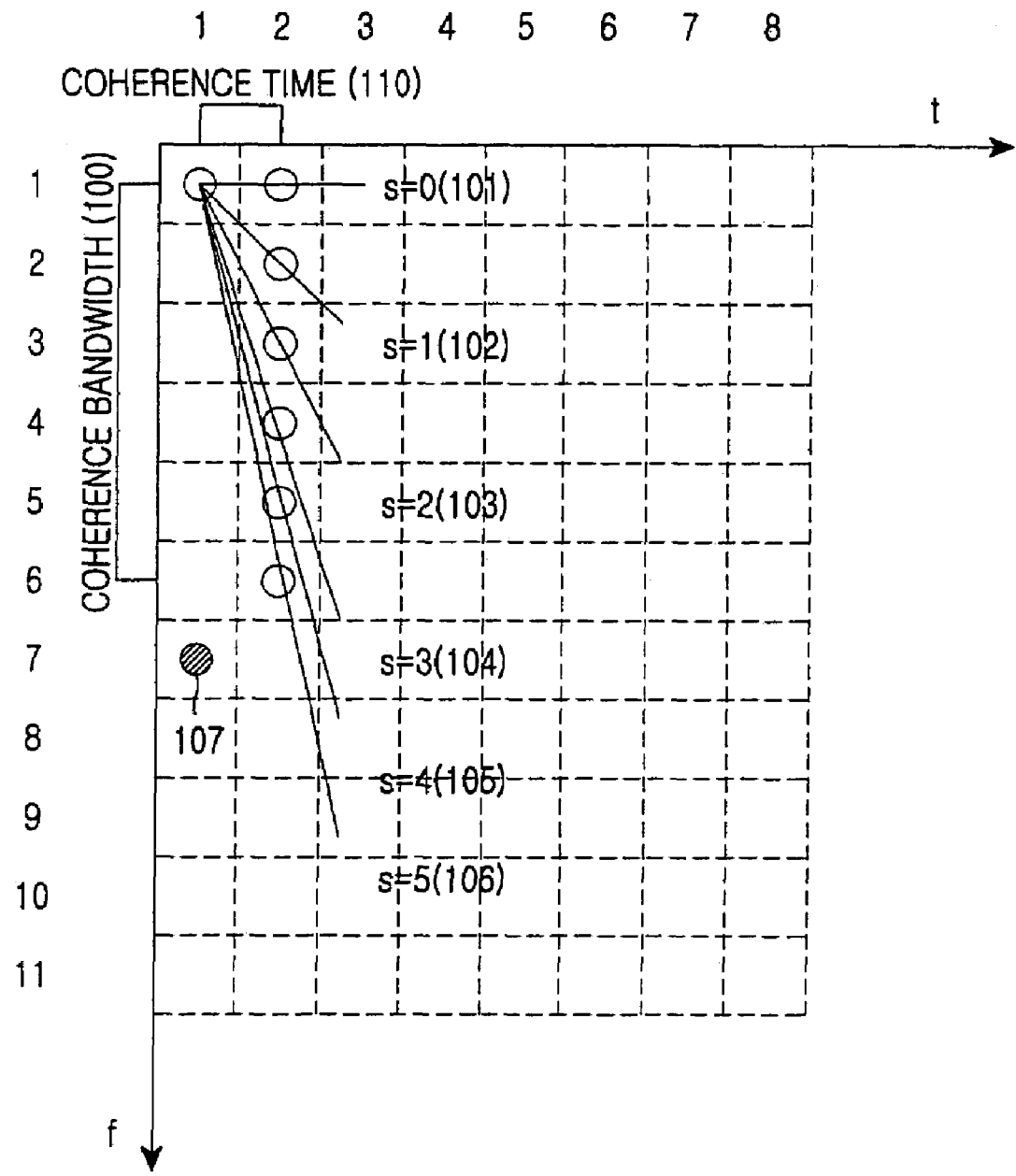
FIG. 1 is a diagram illustrating all possible slopes for generation of pilot patterns in a conventional OFDM communication system.
Figure 2:
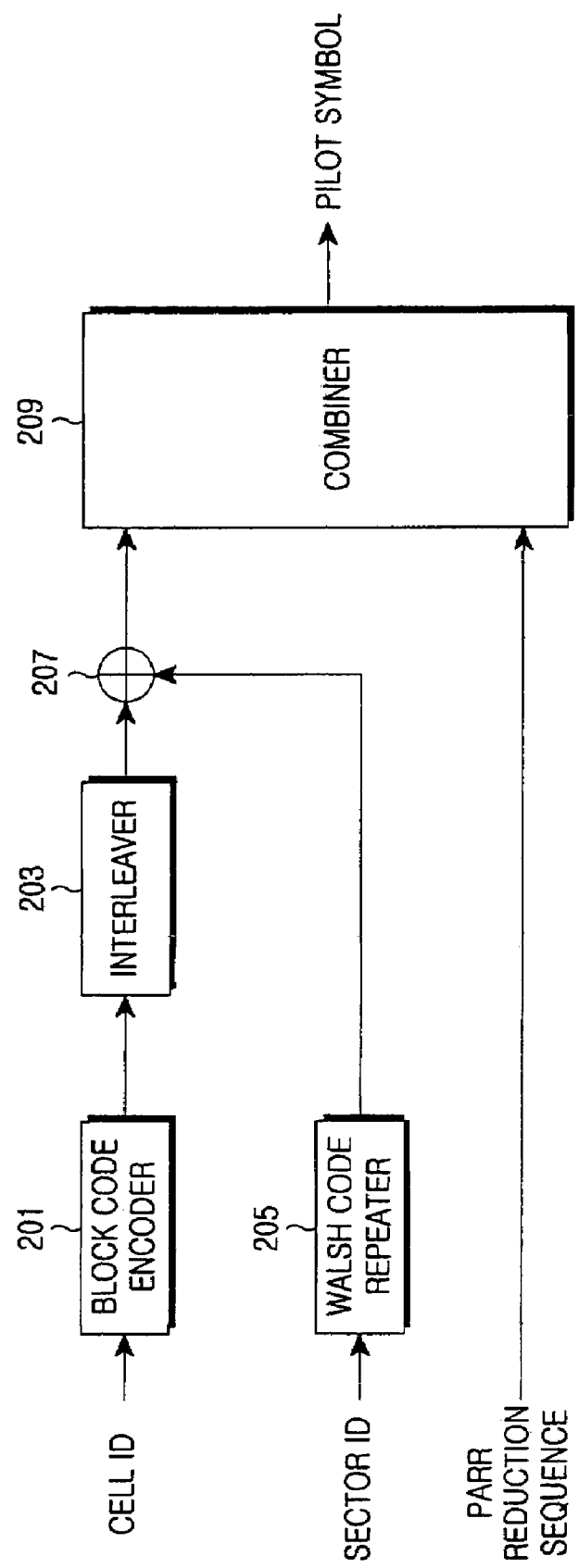
FIG. 2 is a diagram illustrating an internal structure of a pilot signal generator in an OFDM communication system according to an embodiment of the present invention.

FIG. 2 is a diagram illustrating an internal structure of a pilot signal generator in an OFDM communication system according to an embodiment of the present invention. Referring to FIG. 2, the pilot signal generator includes a block code encoder 201, an interleaver 203, a Walsh code repeater 205, an adder 207, and a combiner 209.

A cell identifier (ID), an ID used to identify a BS, is input to the block code encoder 201. Upon receiving the cell ID, the block code encoder 201 generates a codeword corresponding to the cell ID, i.e. a block code, from a generator matrix previously stored therein, and outputs the block code to the interleaver 203. The generator matrix is generated such that block codes corresponding to the corresponding cell ID can be clearly distinguished from each other.

The interleaver 203 interleaves a signal output from the block code encoder 201 using an interleaving scheme, and outputs the interleaved signal to the adder 207. The interleaver 203 interleaves a signal output from the block code encoder 201 because when a particular pattern is frequently repeated in a block code generated in the block code encoder 201 the peak-to-average power ratio (PAPR) of the pilot signal increases. That is, the interleaver 203 interleaves all of the block codes generated in the block code encoder 201, thereby improving the PAPR characteristic of the pilot signals.

A sector ID, an ID used to identify a sector, is input to the Walsh code repeater 205. Upon receiving the sector ID, the Walsh code repeater 205 repeats a Walsh code corresponding to the sector ID a predetermined number of times, and outputs the repeated Walsh code to the adder 207.

It is assumed herein that the length of the pilot signal, for example, a pilot symbol, is $N_P$, the length of the block code generated in the block code encoder 201 is $N_G$, and the length of the Walsh code is $N_W$. In this case, the Walsh code repeater 205 repeats the Walsh code corresponding to the sector ID, $N_G/N_W$ times. The length of the signal output from the Walsh code repeater 205 is equal to the length $N_G$ of the signal output from the interleaver 203.

The adder 207 performs an exclusive OR (XOR) operation on the output signal of the interleaver 203 and the output signal of the Walsh code repeater 205, and outputs the resultant signal to the combiner 209.

A PAPR reduction sequence is a sequence for reducing a PAPR of the pilot symbols and has a length of $N_R$. The PAPR reduction sequence is previously determined in the OFDM communication system according to the cell ID and the sector ID, and a detailed description thereof will be provided later herein. The PAPR reduction sequence with the length $N_R$ is input to the combiner 209, and the combiner 209 generates a pilot symbol by allocating the output signal of the adder 207 and the PAPR sequence to a corresponding subcarrier. The length of the pilot symbol output from the combiner 209 is $N_P=N_G+N_R$.

Figure 3:
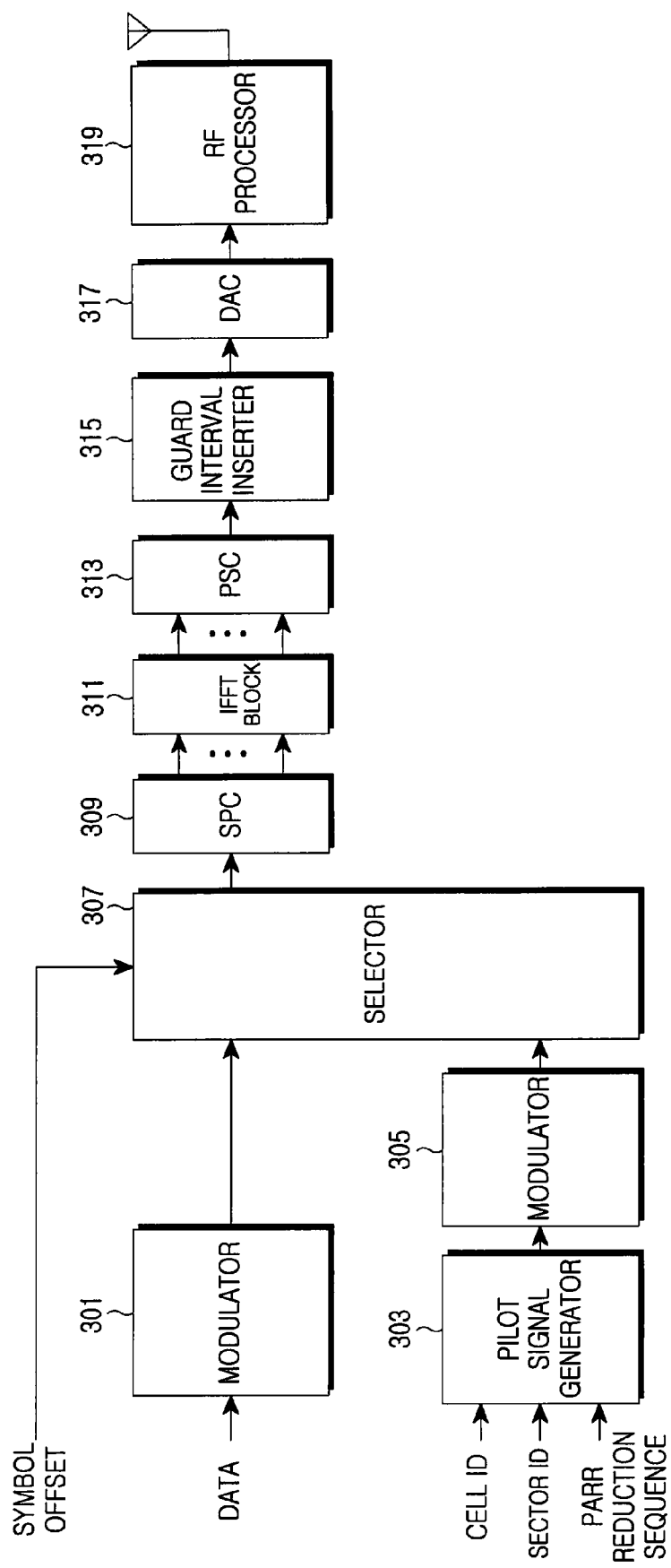
FIG. 3 is a diagram illustrating an internal structure of a transmitter in an OFDM communication system according to an embodiment of the present invention.

FIG. 3 is a diagram illustrating an internal structure of a transmitter in an OFDM communication system according to an embodiment of the present invention. Referring to FIG. 3, the transmitter includes a modulator 301, a pilot signal generator 303, a modulator 305, a selector 307, a serial-to-parallel converter (SPC) 309, an inverse fast Fourier transform (IFFT) block 311, a parallel-to-serial converter (PSC) 313, a guard interval inserter 315, a digital-to-analog converter (DAC) 317, and a radio frequency (RF) processor 319.

Information data bits to be transmitted, if any, are input to the modulator 301. The modulator 301 modulates the information data bits into a modulation symbol according to a modulation scheme, and outputs the modulation symbol to the selector 307. The modulator 301 can use one of a Quadrature Phase Shift Keying (QPSK) scheme and a Quadrature Amplitude Modulation (16QAM) scheme as the modulation scheme.

To transmit a pilot signal, i.e. a pilot symbol, a cell ID and a sector ID of a cell and a sector, to which the pilot symbol is to be transmitted, and a PAPR reduction sequence predetermined according to the cell ID and the sector ID, are input to the pilot signal generator 303. The pilot signal generator 303 generates a pilot symbol using the received cell ID, sector ID and PAPR reduction sequence, and outputs the generated pilot symbol to the modulator 305. The internal structure of the pilot signal generator 303 was shown in FIG. 2. The modulator 305 modulates an output signal of the pilot signal generator 303 into a modulation symbol according to a modulation scheme, and outputs the modulation symbol to the selector 307. The modulator 305 can use a Binary Phase Shift Keying (BPSK) scheme as the modulation scheme.

The selector 307 outputs an output signal of the modulator 301 to the SPC 309 for a data symbol transmission period for which the transmitter should transmit current data symbols, and outputs an output signal of the modulator 305 to the SPC 309 for a pilot symbol transmission period for which the transmitter should transmit current pilot symbols. The SPC 309 parallel-converts serial modulation symbols output from the selector 307, and outputs the resultant signals to the IFFT block 311. The IFFT block 311 performs N-point IFFT on the output signals of the SPC 309, and outputs resultant signals to the PSC 313.

The PSC 313 serial-converts the output signals of the IFFT block 311, and outputs the resultant signal to the guard interval inserter 315. The guard interval inserter 315 inserts a guard interval signal into the output signal of the PSC 313, and outputs the guard interval-inserted signal to the DAC 317. The guard interval signal is inserted to prevent interference between an OFDM symbol transmitted at a previous OFDM symbol time and an OFDM symbol transmitted at a current OFDM symbol time. The output signal of the guard interval inserter 315 becomes one OFDM symbol.

The DAC 317 analog-converts the output signal of the guard interval inserter 315, and outputs the resultant signal to the RF processor 319. The RF processor 319, including a filter and a front-end unit, RF-processes the output signal of the DAC 317 and outputs the RF-processed signal via an antenna.

Figure 4:
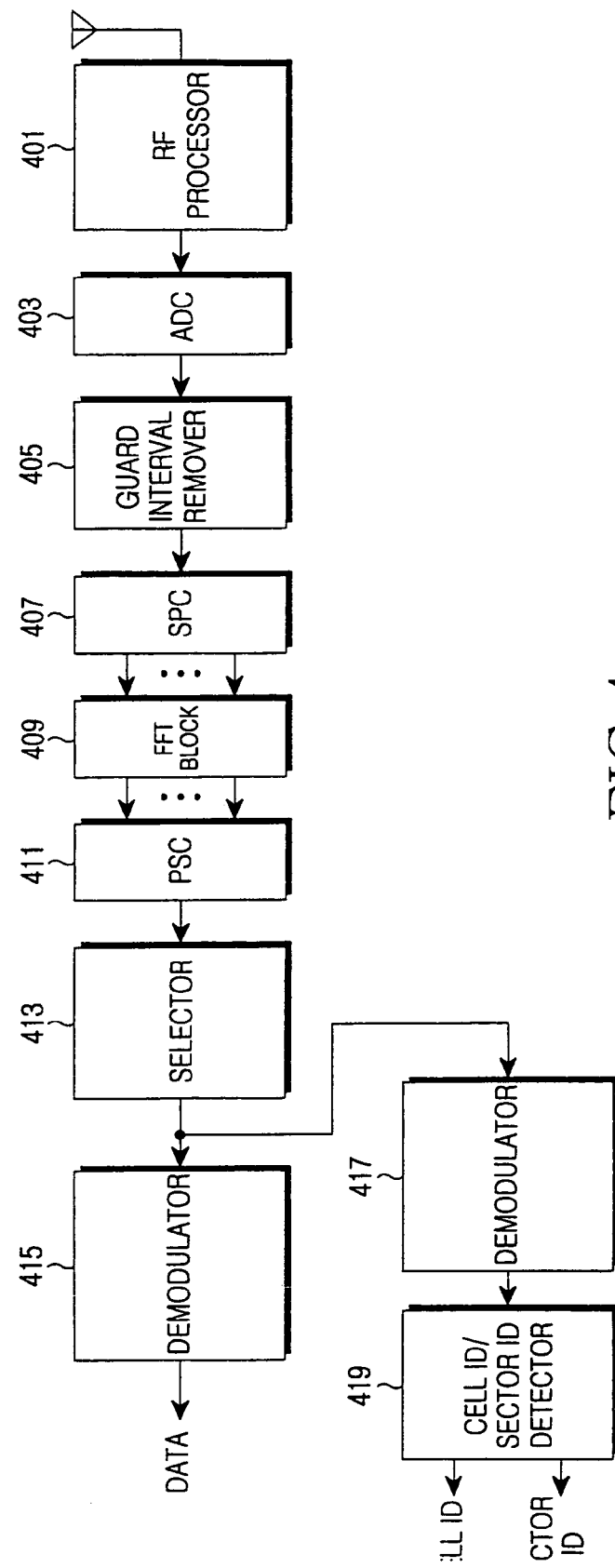
FIG. 4 is a diagram illustrating an internal structure of a receiver in an OFDM communication system according to an embodiment of the present invention.

FIG. 4 is a diagram illustrating an internal structure of a receiver in an OFDM communication system according to an embodiment of the present invention. Referring to FIG. 4, the receiver includes an RF processor 401, an analog-to-digital converter (ADC) 403, a guard interval remover 405, a serial-to-parallel converter (SPC) 407, a fast Fourier transform (FFT) block 409, a parallel-to-serial converter (PSC) 411, a selector 413, demodulators 415 and 417, and a cell ID/sector ID detector 419.

The signal transmitted by the transmitter of the OFDM communication system is received via an antenna of the receiver. The received signal experiences a multipath channel and contains a noise component. The signal received via the antenna is input to the RF processor 401, and the RF processor 401 down-converts the signal received via the antenna into an intermediate frequency (IF) signal, and outputs the IF signal to the ADC 403. The ADC 403 digital-converts an analog signal output from the RF processor 401, and outputs the digital-converted signal to the guard interval remover 405.

The guard interval remover 405 removes a guard interval signal from the output signal of the ADC 403, and outputs the guard interval-removed signal to the SPC 407. The SPC 407 parallel-converts the serial signal output from the guard interval remover 405, and outputs the parallel-converted signal to the FFT block 409. The FFT block 409 performs N-point FFT on the signal output from the SPC 407, and outputs the FFT-processed signal to the PSC 411.

The PSC 411 serial-converts the parallel signal output from the FFT block 409, and outputs the serial-converted signal to the selector 413. The selector 413 outputs the output signal of the FFT block 409 to the demodulator 415 for a data symbol reception period for which the receiver should receive the current data symbol, and outputs the output signal of the FFT block 409 to the demodulator 417 for a pilot symbol reception period for which the receiver should receive the current pilot symbol. The demodulator 415 demodulates the output signal of the FFT block 409 into data, i.e. information data bits, using a demodulation scheme corresponding to the modulation scheme used in the transmitter.

The demodulator 417 demodulates the output signal of the FFT block 409 into a pilot signal using the demodulation scheme corresponding to the modulation scheme used in the transmitter, and outputs the pilot signal to the cell ID/sector ID detector 419. The cell ID/sector ID detector 419 detects a cell ID and a sector ID corresponding to the pilot signal output from the demodulator 417. The pilot signal is a signal generated according to the cell ID and the sector ID, and is predefined between the transmitter and the receiver.

Figure 5:
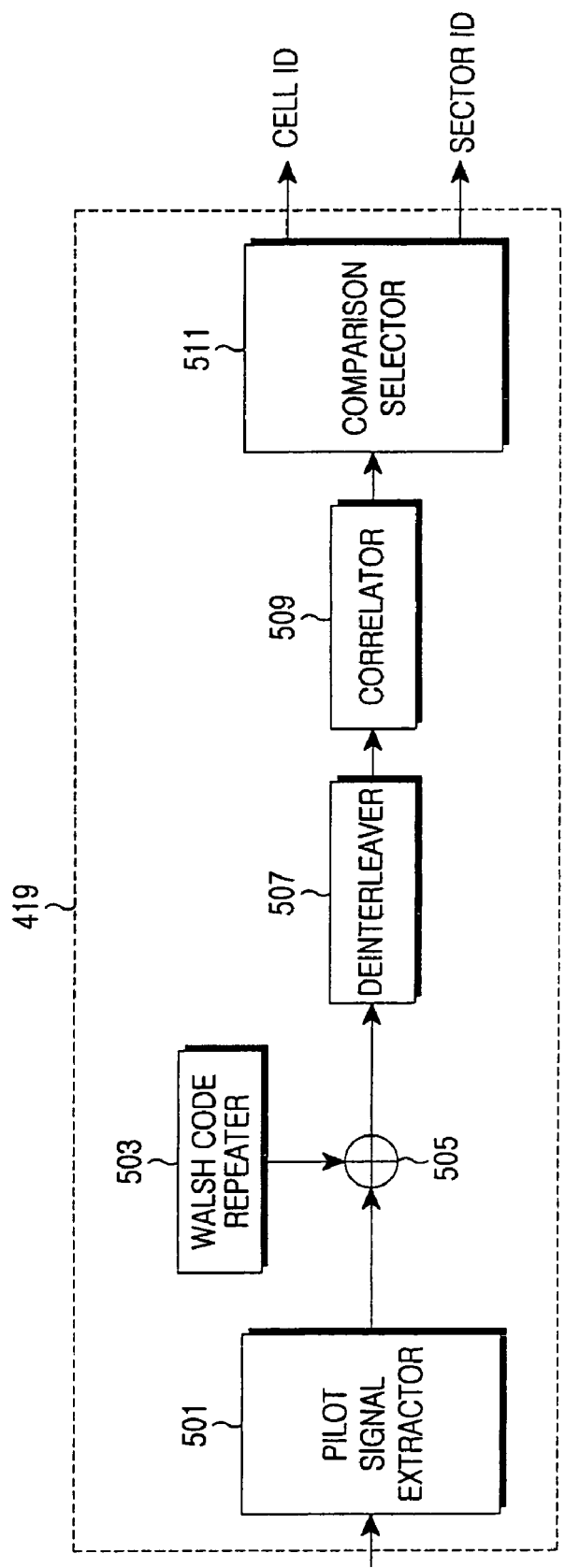
FIG. 5 is a diagram illustrating an internal structure of the cell ID/sector ID detector of FIG. 4.

FIG. 5 is a diagram illustrating an internal structure of the cell ID/sector ID detector 419 of FIG. 4. Referring to FIG. 5, the cell ID/sector ID detector 419 includes a pilot signal extractor 501, a Walsh code repeater 503, an adder 505, a deinterleaver 507, a correlator 509, and a comparison selector 511.

The output signal of the demodulator 417 is input to the pilot signal extractor 501, and the pilot signal extractor 501 extracts $N_G$ symbols by removing a PAPR reduction sequence from the output signal of the demodulator 417, and outputs the extracted symbols to the adder 505. The Walsh code repeater 503 repeatedly outputs Walsh codes corresponding to all of the sector IDs distinguishable by the receiver, sequentially selects one of the Walsh codes corresponding to all of the sector IDs, and repeatedly outputs the selected Walsh code to the adder 505.

The adder 505 performs an XOR operation on the output signal of the pilot signal extractor 501 and the output signal of the Walsh code repeater 503, and outputs the resultant signal to the deinterleaver 507. The deinterleaver 507 deinterleaves the output signal of the adder 505 using a deinterleaving scheme corresponding to the interleaving scheme applied in an internal interleaver of the pilot signal generator of the transmitter, i.e. the interleaver 203 of FIG. 2, and outputs the deinterleaved signal to the correlator 509. The correlator 509 receives the output signal of the deinterleaver 507, performs correlation on each of the block codes corresponding to all of the cell IDs distinguishable by the receiver and Walsh codes corresponding to all of the sector IDs, and outputs the correlation results to the comparison selector 511.

The comparison selector 511 receives the output signal of the correlator 509, selects a correlation value having the maximum value from among the correlation values for the block codes corresponding to all of the cell IDs, output from the correlator 509, and Walsh codes corresponding to all of the sector IDs, and outputs a cell ID and a sector ID corresponding to the selected maximum correlation value.

Figure 6:
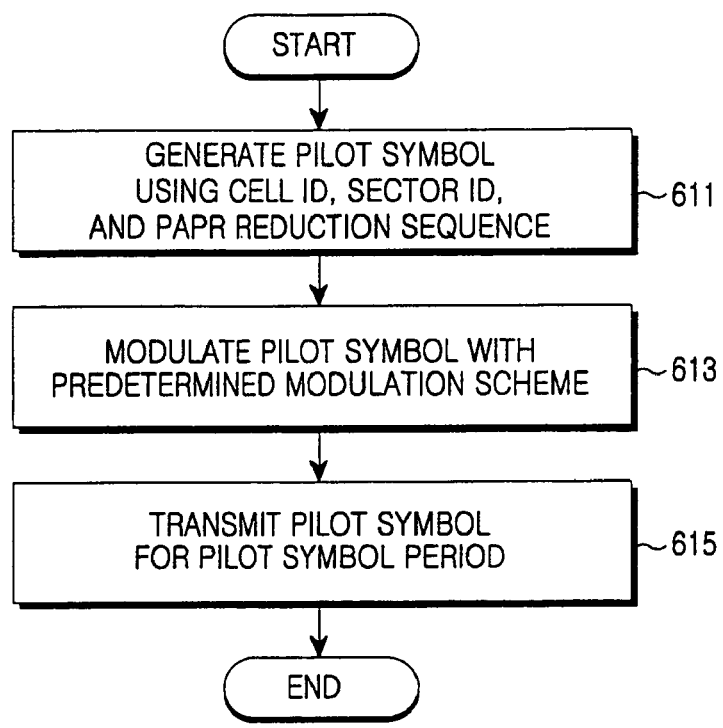
FIG. 6 is a flowchart illustrating an operating process of a transmitter in an OFDM communication system according to an embodiment of the present invention.

FIG. 6 is a flowchart illustrating an operating process of a transmitter in an OFDM communication system according to an embodiment of the present invention. In FIG. 6, a description will be made of only a pilot signal transmission operation of the transmitter, and a detailed description of a data signal transmission operation will be omitted herein because it is not directly related to the present invention. Referring to FIG. 6, in step 611, the transmitter generates pilot symbols using a cell ID of the corresponding transmitter, a sector ID and a PAPR reduction sequence, and then proceeds to step 613. The generating the pilot symbols has been described with reference to FIG. 2. In step 613, the transmitter modulates the generated pilot symbols into modulation symbols according to a modulation scheme, for example, BPSK.

In step 615, the transmitter transmits the modulated pilot symbols for a pilot symbol period, and then ends the operating process. Although not separately illustrated in FIG. 6, a frequency offset can be taken into consideration in the process of transmitting the pilot symbols. That is, start points of the pilot symbols can be different for each cell and sector. Alternatively, a system using multiple transmission antennas can transmit the pilot symbols via the transmission antennas with different frequency offsets.

Figure 7:
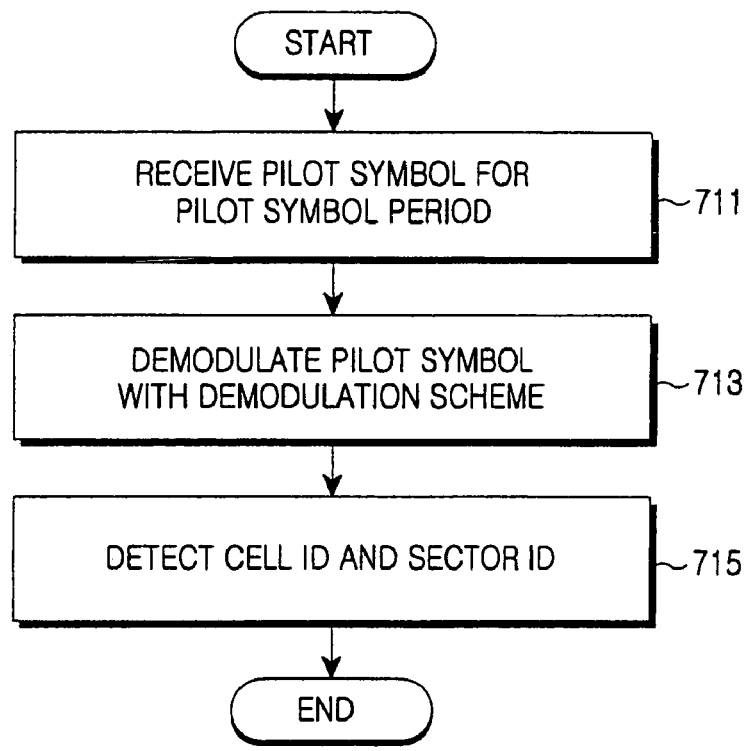
FIG. 7 is a flowchart illustrating an operating process of a receiver in an OFDM communication system according to an embodiment of the present invention.

FIG. 7 is a flowchart illustrating an operating process of a receiver in an OFDM communication system according to an embodiment of the present invention. In FIG. 7, a description will be made of only a pilot signal reception operation of the receiver, and a detailed description of a data signal reception operation will be omitted herein because it is not directly related to the present invention. Referring to FIG. 7, in step 711, the receiver receives the pilot symbols in a pilot symbol period, and then proceeds to step 713. Although not separately illustrated in FIG. 7, in the case where the transmitter has transmitted the pilot symbols taking into consideration a frequency offset as described above, the receiver receives the pilot symbols after determining the symbol start points according to the frequency offset. In step 713, the receiver demodulates the received pilot symbols using a demodulation scheme corresponding to a modulation scheme applied in its associated transmitter. In step 715, the receiver correlates block codes corresponding to all of its distinguishable cell IDs and Walsh codes corresponding to all of the sector IDs, detects a cell ID and a sector ID having the maximum correlation value as a cell ID and a sector ID of the transmitter, and then ends the operating process.

Figure 8:
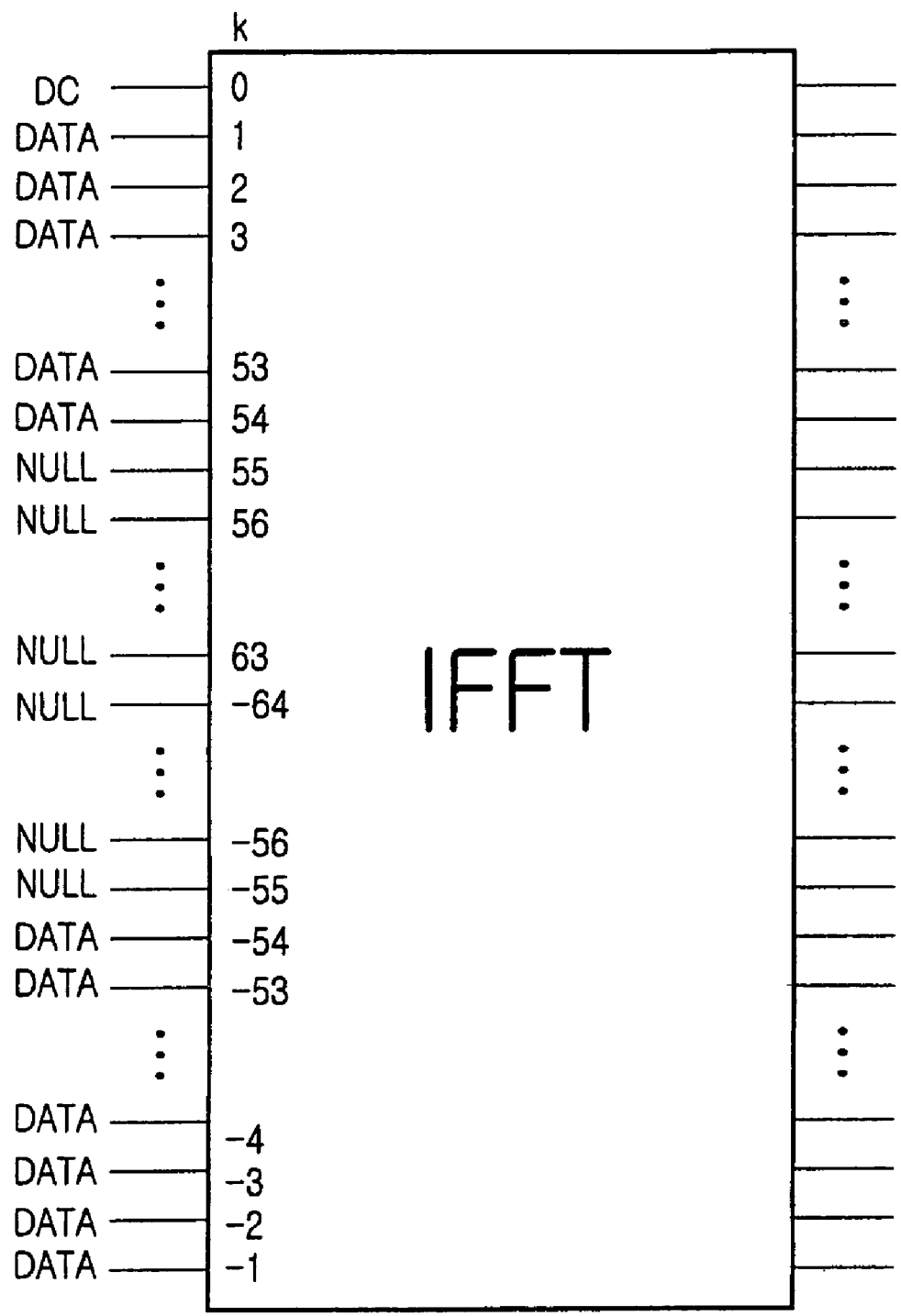
FIG. 8 is a diagram illustrating a mapping relationship between subcarriers and a pilot symbol during an IFFT operation in an OFDM communication system according to an embodiment of the present invention.

FIG. 8 is a diagram illustrating a mapping relationship between subcarriers and a pilot symbol during an IFFT operation in an OFDM communication system according to an embodiment of the present invention. It will be assumed in FIG. 8 that the total number of subcarriers used in the OFDM communication system is 128, and the number of subcarriers in actual use among the 128 subcarriers is 108, i.e. including 54 subcarriers of a $-54^{th}$ subcarrier to a $-1^{st}$ subcarrier and 54 subcarriers of a $1^{st}$ subcarrier to a $54^{th}$ subcarrier. In FIG. 8, unique numbers 'k' of the input terminals of an IFFT block represent indexes of the subcarriers of the OFDM communication system. Because a $0^{th}$ subcarrier represents a DC component, null data is inserted into the $0^{th}$ subcarrier.

Also, the null data is inserted into subcarriers obtained by excluding the 108 subcarriers in actual use and the $0^{th}$ subcarrier, i.e. the subcarriers of a $-55^{th}$ subcarrier to a $-64^{th}$ subcarrier and subcarriers of a $55^{th}$ subcarrier to a $63^{rd}$ subcarrier.

The null data is inserted into the subcarriers of the $-55^{th}$ subcarrier to the $-64^{th}$ subcarrier and the subcarriers of the $55^{th}$ subcarrier to the $63^{rd}$ subcarrier because the subcarriers of the $-55^{th}$ subcarrier to the $-64^{th}$ subcarrier and the subcarriers of the $55^{th}$ subcarrier to the $63^{rd}$ subcarrier correspond to a guard band for preventing interference with another system using a guard interval region in a time domain, i.e. an adjacent frequency band in a frequency band.

Upon receiving a frequency-domain pilot symbol, the IFFT block performs IFFT after mapping the received frequency-domain pilot symbol to the corresponding subcarriers, and outputs a time-domain pilot symbol.

Figure 9:
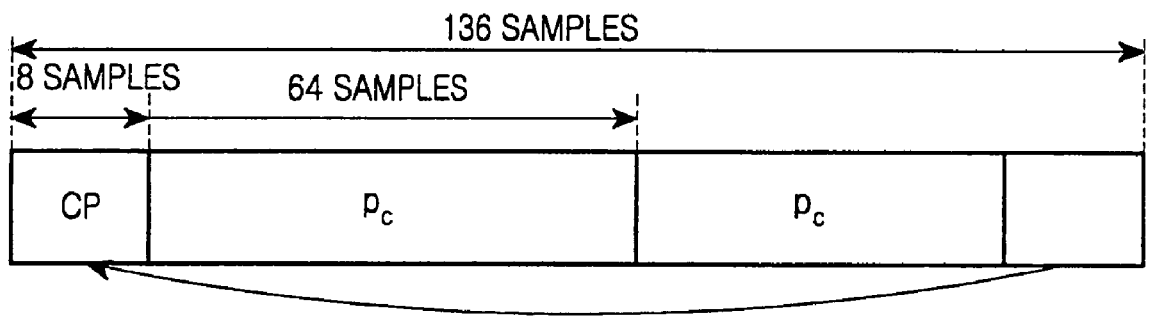
FIG. 9 is a diagram illustrating a pilot symbol structure in a time domain in an OFDM communication system according to an embodiment of the present invention.

FIG. 9 is a diagram illustrating a pilot symbol structure in a time domain in an OFDM communication system according to an embodiment of the present invention. Referring to FIG. 9, the pilot symbol has a structure in which a symbol with a length $p_c = N_{FFT}/2$ is repeated two times and a guard interval signal inserted in a Cyclic Prefix (CP) method according to the characteristic of the OFDM communication system is added to the head of the repeated symbol. The $N_{FFT}$ represents the number of points of an IFFT/FFT block used in the OFDM communication system. Because the number of points of the IFFT/FFT block used in the OFDM communication system is 128 as described with reference to FIG. 8, the length $p_c$ of the pilot symbol becomes 64.

Figure 10:
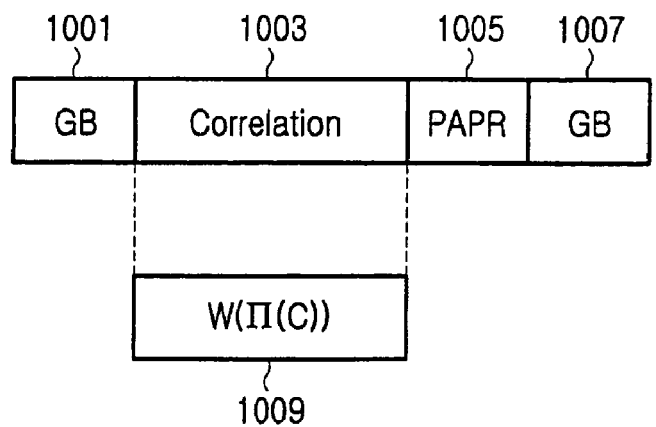
FIG. 10 is a diagram illustrating a pilot symbol structure in a frequency domain in an OFDM communication system according to an embodiment of the present invention.

FIG. 10 is a diagram illustrating a pilot symbol structure in a frequency domain in an OFDM communication system according to an embodiment of the present invention. Referring to FIG. 10, a subcarrier period excluding guard bands 1001 and 1007 is roughly divided into a correlation period 1003 and a PAPR period 1005. The correlation period 1003 is comprised of a sequence generated by combining a sequence, i.e. a block code, having a greater correlation value with Walsh codes, and the PAPR period 1005 is comprised of a PAPR reduction sequence for each of sequences that are included in the correlation period 1003. As illustrated in FIG. 10, the pilot symbol is comprised of a first-part sequence, i.e. a sequence corresponding the correlation period 1003, and a second-part sequence, i.e. a sequence corresponding to the PAPR period 1005. A sequence inserted into the correlation period 1003, i.e. a sequence output from the adder 207 of FIG. 2, will be referred to as a "correlation sequence." Calculation of a correlation value described with reference to FIG. 5 is achieved only for the correlation period 1003.

In FIG. 10, C represents a block code with a length of 48, $\Pi(\cdot)$ represents an interleaving scheme with a length of 48, and the length-48 block code is interleaved according to the $\Pi(\cdot)$. In addition, $W(\cdot)$ represents Walsh code masking.

The pilot symbol is generated by a frequency-domain sequence given by $$P_{ID_{cell},s}[k] = \begin{cases} \sqrt{2}(1 - 2q_{ID_{cell},s}[m]), & k = 2m - \frac{N_{used}}{2}, m = 0, 1, \ldots, \frac{N_{used}}{4} - 1 \\ \sqrt{2}(1 - 2q_{ID_{cell},s}[m-1]), & k = 2m - \frac{N_{used}}{2}, m = \frac{N_{used}}{4} + 1, \frac{N_{used}}{4} + 2, \ldots, \frac{N_{used}}{2} \\ 0, & \text{otherwise} \end{cases} \tag{1}$$

$$ID_{cell} \in \{0, 1, \ldots, 126\}, s \in \{0, 1, \ldots, 7\},$$

$$k \in \{-N_{FFT}/2, -N_{FFT}/2 + 1, \ldots, N_{FFT}/2 - 1,\}.$$

In Equation (1), $ID_{cell}$ represents a cell ID, 's' represents a sector ID, 'k' represents a subcarrier index, and $N_{used}$ represents the number of subcarriers actually used in the OFDM communication system, i.e. the number of subcarriers determined by excluding a DC component and a guard interval component. It will be assumed herein that pilot symbols for all of the base stations and sectors use the same frequency offset. As shown in Equation (1), a frequency-domain sequence $P_{ID_{cell},s}[k]$ is allocated only to the subcarriers with even indexes in accordance with Equation (1), and because a value of 0 is unconditionally allocated to the subcarriers with odd indexes, the same sequence is repeated twice in a time domain during an IFFT operation.

Further, in Equation (1), $\sqrt{2}$ is a weight value which is set such that a transmission power level of a pilot symbol should be equal to a transmission power level of a data symbol transmitted for the other period except the pilot symbol period, i.e., for a data symbol period, and $q_{ID_{cell},s}[m]$ is defined as $$q_{ID_{cell},s}[m] = \begin{cases} R\left(8 * \left\lfloor \frac{m}{9} \right\rfloor + m \bmod 9\right), & \text{where } m \bmod 9 = 0, 1, \ldots, 7 \\ T\left(\left\lfloor \frac{m}{9} \right\rfloor\right), & \text{where } m \bmod 9 = 8 \end{cases} \quad m = 0, 1, \ldots, 53 \tag{2}$$

In Equation (2), $$\left\lfloor \frac{m}{9} \right\rfloor$$

represents a maximum integer not greater than m/9, and R(r) can be written as $$R(r) = w_{rmod8}^s \oplus b_{ID_{cell}+1} g_{\Pi(r)}, r = 8*\left\lfloor\frac{m}{9}\right\rfloor + m \bmod 9 = 0, 1, \ldots, 47 \quad (3)$$

In Equation (3), $w_{rmod8}^s$ represents repetition of a length-8 Walsh code corresponding to a sector ID=s. If a particular decimal number k ($1 \leq k \leq 127$) is expressed as a binary number of $b_6 b_5 b_4 b_3 b_2 b_1 b_0$, where $b_6$ is a most significant bit (MSB) and $b_0$ is a least significant bit (LSB), then $b_k$ represents a row vector and $b_k = \{b_0 b_1 b_2 b_3 b_4 b_5 b_6\}$. Further, in Equation (3), $g_u$ ($0 \leq u \leq 47$) represents a $u^{th}$ column vector of a block code generator matrix G. The block code generator matrix G is given by $$G = [g_0 g_1 \ldots g_{47}] = \quad (4)$$

$$\begin{bmatrix} 010101010101010101010101010101010101010101010101 \\ 001100110011001100110011001100110011001100110011 \\ 000011110000111100001111000011110000111100001111 \\ 000000001111111100000000111111110000000011111111 \\ 000000000000000011111111111111110000000101010110 \\ 000001010011011000000010100110110000001010110011 \\ 000000000101010100110011011001100001000100010001 \end{bmatrix}$$

In Equation (4), $b_k g_u$ represents a matrix product of a 1×7 row vector and a 7×1 column vector, and the matrix product is expressed in a scalar value, for which a modulo-2 addition and multiplication operation is used. Further, in Equation (4), $\Pi(r)$ ($0 \leq r \leq 47$) represents an interleaving scheme of the interleaver 203 in FIG. 2, and the interleaving scheme is shown in Table 1.

TABLE 1

| $\Pi(r)$ | 27,1,30,29,11,2,42,9,45,13,8,4,20,24,34,12,36,16,46,3, 47,15,5,40,37,31,25,32,33,14,43,6,44,21,19,18,41,39,28, 38,17,10,35,7,26,0,23,22 |
|---|---|

The interleaving scheme $\Pi(r)$ permutes 48 elements constituting the length-48 block code in the order shown in Table 1.

Further, in Equation (2), a value of a sequence $$T(s)\left(s = \left\lfloor\frac{m}{9}\right\rfloor\right) = 0, 1, \ldots, 5$$

is determined as a PAPR reduction sequence that minimizes a PAPR of the pilot symbol. A PAPR reduction sequence corresponding to the cell ID and sector ID, and a PAPR of a pilot symbol corresponding to the cell ID and sector ID and the PAPR reduction sequence are shown in Table 2.

TABLE 2

| $ID_{cell}$ | s | PAPR reduction sequence | PAPR (dB) |
|---|---|---|---|
| 0 | 0 | 1 1 0 0 1 0 | 5.61978 |
| 0 | 1 | 0 1 0 1 0 1 | 4.99418 |
| 0 | 2 | 0 1 1 0 1 1 | 4.54736 |
| 0 | 3 | 1 1 1 1 1 0 | 4.98007 |
| 0 | 4 | 1 0 0 0 1 1 | 6.30234 |
| 0 | 5 | 1 0 1 0 0 1 | 5.39782 |
| 0 | 6 | 1 1 0 1 1 0 | 4.74195 |
| 0 | 7 | 0 1 0 0 1 1 | 5.25707 |
| 1 | 0 | 1 0 0 1 0 0 | 4.46729 |
| 1 | 1 | 1 1 0 0 0 0 | 4.94188 |
| 1 | 2 | 0 1 1 1 0 1 | 5.99483 |
| 1 | 3 | 1 1 0 0 1 1 | 5.60087 |
| 1 | 4 | 1 1 0 1 0 1 | 5.33822 |
| 1 | 5 | 0 0 0 0 1 1 | 5.69019 |
| 1 | 6 | 1 1 0 1 1 1 | 7.00666 |
| 1 | 7 | 1 1 1 1 0 0 | 4.74447 |

The foregoing pilot signal transmission/reception scheme can also be applied to an OFDM communication system that uses a Multiple Input Multiple Output (MIMO) scheme and does not require sector identification. In this case, because there is no need for the sector identification, the alternative pilot signal transmission/reception scheme, unlike the foregoing pilot signal transmission/transmission scheme, uses the same Walsh code, for example, an all-1 Walsh code instead of using Walsh codes that was generated separately according to the sector IDs. The all-1 Walsh code refers to a Walsh code, in which all of the elements constituting the corresponding Walsh code are 1.

If a transmitter, for example, a base station, of the OFDM communication system uses $N_t$ transmission antennas, then pilot symbols transmitted through each of the $N_t$ transmission antennas can be expressed as $$P_{ID_{cell},n}[k] =$$

$$\begin{cases} 1 - 2q_{ID_{cell}}[m], k = N_t m - \frac{N_{used}}{2} + n, m = 0, 1, \ldots, \frac{N_{used}}{N_t} - 1 \\ 0, \text{otherwise} \end{cases}$$

$$ID_{cell} \in \{0, 1, \ldots, 126\}, n = 0, 1, \ldots, N_t - 1,$$

$$k \in \left\{-\frac{N_{FFT}}{2}, -\frac{N_{FFT}}{2} + 1, \ldots, \frac{N_{FFT}}{2} - 1,\right\}$$

In Equation (5), 'n' denotes a transmission antenna ID, and 'k' denotes a subcarrier index. Further, $q_{ID_{cell}}[m]$ in Equation (5) is defined as $$q_{ID_{cell},s}[m] = \quad (6)$$

$$\begin{cases} R\left(8*\left\lfloor\frac{m}{9}\right\rfloor + m \bmod 9\right), \text{where } m \bmod 9 = 0, 1, \ldots, 7 \\ T\left(\left\lfloor\frac{m}{9}\right\rfloor\right), \text{where } m \bmod 9 = 8 \end{cases} \quad m = 0, 1, \ldots, \frac{N_{used}}{N_t} - 1$$

In Equation (6), sequences R(r) and T(k) are defined depending on the number $N_t$ of the transmission antennas and the number $N_{FFT}$ of the ports for an IFFT/FFT operation used in the OFDM communication system. Therefore, the $q_{ID_{cell}}[m]$ is also defined depending on the number $N_t$ of the transmission antennas and the number $N_{FFT}$ of the ports for an IFFT/FFT operation used in the OFDM communication system.

A description will now be made of the R(r), the T(k) and the $q_{ID_{cell}}[m]$, all of which are dependent on the number $N_t$ of the transmission antennas and the number $N_{FFT}$ of points for an IFFT/FFT operation used in the OFDM communication system.

If the number of the transmission antennas is $N_t=4$ and the number of points for an IFFT/FFT operation used in the OFDM communication system is $N_{FFT}=128$, then the R(r) is rewritten as $$R(r) = b_{ID_{cell}+1} g_{\pi(r)}, \; r = 8 * \left\lfloor \frac{m}{9} \right\rfloor + m \bmod 9 = 0, 1, \ldots, 23 \quad (7)$$

In the case of Equation (7), a block code generator matrix G is given as $$G = [g_0 g_1 \ldots g_{23}] = \begin{bmatrix} 010101010101010101010101 \\ 001100110011001100110011 \\ 000011110000111100001111 \\ 111111110000000011111111 \\ 000000001111111111111111 \\ 111111001010000010010000 \\ 111110100000011000001100 \end{bmatrix} \quad (8)$$

In the case of Equation (7), the interleaving scheme is defined as

TABLE 3

| $\Pi(r)$ | 11,6,4,9,7,8,0,10,5,1,2,3,17,20,21,14,18,16,23,15,19,22,12,13 |
|---|---|

In Equation (6), the T(k) is defined as Table 4, and the $q_{ID_{cell}}[m]$ is defined as hexadecimal numbers shown in Table 5.

TABLE 4

| ID cell | sequence | papr |
|---|---|---|
| 0 | 0 1 0 | 5.35724 |
| 1 | 0 0 0 | 5.17414 |
| 2 | 1 1 1 | 6.51422 |
| 3 | 0 0 0 | 3.82903 |
| 4 | 1 1 0 | 5.5707 |
| 5 | 1 1 1 | 4.51562 |
| 6 | 1 0 1 | 4.99659 |
| 7 | 1 0 0 | 4.507 |
| 8 | 0 0 0 | 2.77148 |
| 9 | 0 1 1 | 4.52863 |
| 10 | 0 0 1 | 4.77121 |
| 11 | 1 0 0 | 4.59416 |
| 12 | 0 1 0 | 3.78955 |
| 13 | 1 0 0 | 4.60896 |
| 14 | 1 0 0 | 4.5935 |
| 15 | 1 0 0 | 4.22853 |
| 16 | 1 0 1 | 4.53933 |
| 17 | 1 0 0 | 4.22832 |
| 18 | 0 1 1 | 4.53739 |
| 19 | 0 0 1 | 4.84545 |

TABLE 4-continued

| ID cell | sequence | papr |
|---|---|---|
| 20 | 1 0 0 | 5.1608 |
| 21 | 1 1 0 | 6.19203 |
| 22 | 0 0 1 | 4.58568 |
| 23 | 0 1 1 | 5.684 |
| 24 | 0 1 0 | 4.76503 |
| 25 | 0 0 0 | 4.77579 |
| 26 | 0 1 0 | 4.73628 |
| 27 | 1 0 0 | 4.98055 |
| 28 | 0 1 1 | 4.77121 |
| 29 | 1 0 0 | 4.44124 |
| 30 | 0 0 0 | 5.17708 |
| 31 | 0 0 0 | 4.2966 |
| 32 | 1 0 1 | 4.61762 |
| 33 | 1 0 1 | 3.5604 |
| 34 | 0 1 0 | 5.96329 |
| 35 | 0 0 0 | 6.00008 |
| 36 | 0 1 1 | 5.2032 |
| 37 | 0 1 1 | 5.5032 |
| 38 | 1 1 1 | 4.63273 |
| 39 | 0 0 0 | 4.79863 |
| 40 | 1 1 1 | 6.68743 |
| 41 | 1 0 1 | 4.93428 |
| 42 | 1 1 0 | 5.43501 |
| 43 | 1 1 1 | 5.22032 |
| 44 | 0 0 0 | 6.51422 |
| 45 | 1 1 1 | 4.98055 |
| 46 | 0 0 1 | 3.50075 |
| 47 | 0 0 0 | 5.08034 |
| 48 | 0 1 0 | 5.41647 |
| 49 | 1 1 0 | 4.02914 |
| 50 | 0 1 0 | 3.77237 |
| 51 | 1 1 1 | 3.99062 |
| 52 | 0 1 1 | 4.62794 |
| 53 | 1 0 0 | 4.81314 |
| 54 | 0 0 0 | 4.20522 |
| 55 | 1 0 0 | 5.39106 |
| 56 | 0 1 1 | 5.58402 |
| 57 | 1 1 1 | 4.58125 |
| 58 | 0 0 0 | 4.72378 |
| 59 | 0 0 0 | 4.16781 |
| 60 | 0 0 1 | 6.57249 |
| 61 | 1 0 0 | 3.98784 |
| 62 | 0 0 1 | 5.95339 |
| 63 | 1 1 0 | 5.27337 |
| 64 | 0 1 1 | 3.52173 |
| 65 | 0 0 0 | 5.01602 |
| 66 | 0 0 1 | 6.01058 |
| 67 | 0 1 0 | 4.70152 |
| 68 | 0 0 0 | 3.37021 |
| 69 | 0 0 1 | 5.18544 |
| 70 | 1 0 1 | 5.59372 |
| 71 | 1 1 0 | 4.64525 |
| 72 | 0 0 0 | 4.54804 |
| 73 | 1 0 1 | 6.18314 |
| 74 | 0 1 0 | 4.32808 |
| 75 | 0 0 1 | 4.56337 |
| 76 | 0 0 0 | 5.36844 |
| 77 | 0 1 1 | 4.98055 |
| 78 | 0 0 0 | 4.43788 |
| 79 | 1 0 0 | 6.51422 |
| 80 | 1 1 1 | 4.21693 |
| 81 | 0 0 1 | 4.73888 |
| 82 | 1 1 1 | 5.31912 |
| 83 | 0 0 1 | 6.51422 |
| 84 | 0 0 1 | 6.01936 |
| 85 | 1 0 1 | 5.38087 |
| 86 | 1 1 0 | 4.70313 |
| 87 | 0 0 0 | 3.79899 |
| 88 | 1 0 0 | 5.31434 |
| 89 | 1 1 0 | 6.41534 |
| 90 | 0 0 1 | 4.11983 |
| 91 | 1 1 0 | 4.18856 |
| 92 | 0 1 0 | 4.81524 |
| 93 | 0 1 0 | 5.0717 |
| 94 | 0 1 0 | 5.05024 |
| 95 | 0 0 0 | 4.77121 |
| 96 | 1 0 0 | 4.18255 |

TABLE 4-continued

| ID cell | sequence | papr |
|---|---|---|
| 97 | 1 1 0 | 3.49527 |
| 98 | 0 1 0 | 4.47417 |
| 99 | 0 1 1 | 6.09081 |
| 100 | 1 0 1 | 4.2738 |
| 101 | 0 0 1 | 3.77032 |
| 102 | 0 0 0 | 4.79531 |
| 103 | 1 1 0 | 3.80557 |
| 104 | 0 0 1 | 3.67728 |
| 105 | 1 0 0 | 5.55408 |
| 106 | 1 1 1 | 4.96913 |
| 107 | 0 1 1 | 4.52983 |
| 108 | 0 1 1 | 5.0537 |
| 109 | 0 1 1 | 4.67829 |
| 110 | 1 0 1 | 6.11194 |
| 111 | 1 1 0 | 3.53966 |
| 112 | 1 0 0 | 4.49668 |
| 113 | 0 0 0 | 4.44827 |
| 114 | 1 1 1 | 5.4278 |
| 115 | 1 0 0 | 6.33804 |
| 116 | 0 1 0 | 5.31678 |
| 117 | 1 1 0 | 4.77121 |
| 118 | 0 0 1 | 4.9246 |
| 119 | 0 1 0 | 4.46379 |
| 120 | 0 1 1 | 4.32577 |
| 121 | 1 1 1 | 5.88992 |
| 122 | 0 0 0 | 5.02873 |
| 123 | 1 0 1 | 5.70347 |
| 124 | 1 1 0 | 6.14544 |
| 125 | 0 0 1 | 4.75797 |
| 126 | 1 1 0 | 4.66479 |

TABLE 5

| ID cell | sequence | papr |
|---|---|---|
| 0 | 986D4F4 | 5.35724 |
| 1 | C918AF0 | 5.17414 |
| 2 | 51F5F16 | 6.51422 |
| 3 | 68438DC | 3.82903 |
| 4 | F0AFC38 | 5.5707 |
| 5 | A1DB62F | 4.51562 |
| 6 | 39B62CA | 4.99659 |
| 7 | 6AFF3B0 | 4.507 |
| 8 | F212354 | 2.77148 |
| 9 | A367D42 | 4.52863 |
| 10 | 3B0A9A6 | 4.77121 |
| 11 | 02BCB6C | 4.59416 |
| 12 | 9A51F88 | 3.78955 |
| 13 | CBA419C | 4.60896 |
| 14 | 53C9178 | 4.5935 |
| 15 | 9587BFC | 4.22853 |
| 16 | 0DFAB1A | 4.53933 |
| 17 | 5C9F10C | 4.22832 |
| 18 | C4725FA | 4.53739 |
| 19 | FD44322 | 4.84545 |
| 20 | 65A93C4 | 5.1608 |
| 21 | 34DCDD0 | 6.19203 |
| 22 | AC31936 | 4.58568 |
| 23 | FF78C4F | 5.684 |
| 24 | 6715CA8 | 4.76503 |
| 25 | 36602BC | 4.77579 |
| 26 | AF0D658 | 4.73628 |
| 27 | 97BB090 | 4.98055 |
| 28 | 0F56476 | 4.77121 |
| 29 | 5FA3A60 | 4.44124 |
| 30 | C64FA84 | 5.17708 |
| 31 | 2778120 | 4.2966 |
| 32 | BF951C6 | 4.61762 |
| 33 | FFF0BD2 | 3.5604 |
| 34 | 760DF34 | 5.96329 |
| 35 | 4F3B9FC | 6.00008 |
| 36 | D756D1A | 5.2032 |
| 37 | 862370F | 5.5032 |
| 38 | 1FCF7FA | 4.63273 |

TABLE 5-continued

| ID cell | sequence | papr |
|---|---|---|
| 39 | 4D07290 | 4.79863 |
| 40 | D5FA676 | 6.68743 |
| 41 | 849F862 | 4.93428 |
| 42 | 1CF2C84 | 5.43501 |
| 43 | 25C4F4F | 5.22032 |
| 44 | BD29AA8 | 6.51422 |
| 45 | FCDC4BF | 4.98055 |
| 46 | 743105A | 3.50075 |
| 47 | B27FADC | 5.08034 |
| 48 | 2A12F38 | 5.41647 |
| 49 | 7BF742C | 4.02914 |
| 50 | F30A4C8 | 3.77237 |
| 51 | DABC602 | 3.99062 |
| 52 | 42516F6 | 4.62794 |
| 53 | 13A48F0 | 4.81314 |
| 54 | 8B49814 | 4.20522 |
| 55 | D88096C | 5.39106 |
| 56 | 406DD8A | 5.58402 |
| 57 | 119879F | 4.58125 |
| 58 | 8975378 | 4.72378 |
| 59 | B0431B0 | 4.16781 |
| 60 | 282F156 | 6.57249 |
| 61 | 79DBB40 | 3.98784 |
| 62 | F136BA6 | 5.95339 |
| 63 | 62BBC04 | 5.27337 |
| 64 | FA56CF2 | 3.52173 |
| 65 | AB232F4 | 5.01602 |
| 66 | 334F212 | 6.01058 |
| 67 | 0A784D8 | 4.70152 |
| 68 | 921503C | 3.37021 |
| 69 | C360A2A | 5.18544 |
| 70 | 5B8DACF | 5.59372 |
| 71 | 08C4FB4 | 4.64525 |
| 72 | 9029B50 | 4.54804 |
| 73 | C1DC146 | 6.18314 |
| 74 | 59315A0 | 4.32808 |
| 75 | 600736A | 4.56337 |
| 76 | F86A38C | 5.36844 |
| 77 | A91FD9A | 4.98055 |
| 78 | 317297C | 4.43788 |
| 79 | F7BC3F8 | 6.51422 |
| 80 | 6FD171F | 4.21693 |
| 81 | 3F2490A | 4.73888 |
| 82 | A6C9DFF | 5.31912 |
| 83 | 9F7FB26 | 6.51422 |
| 84 | 0712BC2 | 6.01936 |
| 85 | 56F71D6 | 5.38087 |
| 86 | CF8A530 | 4.70313 |
| 87 | 9D43048 | 3.79899 |
| 88 | 05AF0AC | 5.31434 |
| 89 | 54DBFB8 | 6.41534 |
| 90 | CC36A5F | 4.11983 |
| 91 | F580C94 | 4.18856 |
| 92 | 6D6DC70 | 4.81524 |
| 93 | 3C18664 | 5.0717 |
| 94 | A475680 | 5.05024 |
| 95 | 4543924 | 4.77121 |
| 96 | DDAF9C0 | 4.18255 |
| 97 | 8CDB7D4 | 3.49527 |
| 98 | 1436730 | 4.47417 |
| 99 | 2D005FA | 6.09081 |
| 100 | B5FD11F | 4.2738 |
| 101 | F418B0A | 3.77032 |
| 102 | 7C75BFC | 4.79531 |
| 103 | 2FBCF94 | 3.80557 |
| 104 | B751A72 | 3.67728 |
| 105 | F6A4064 | 5.55408 |
| 106 | 7FC9482 | 4.96913 |
| 107 | 477F64A | 4.52983 |
| 108 | DF126AF | 5.0537 |
| 109 | 8F67CBA | 4.67829 |
| 110 | 168A85F | 6.11194 |
| 111 | D0C46D8 | 3.53966 |
| 112 | 48A923C | 4.49668 |
| 113 | 195C828 | 4.44827 |
| 114 | 81B1CCF | 5.4278 |
| 115 | B887A04 | 6.33804 |

TABLE 5-continued

| ID cell | sequence | papr |
| --- | --- | --- |
| 116 | 206AFF0 | 5.31678 |
| 117 | 719F4F4 | 4.77121 |
| 118 | F972012 | 4.9246 |
| 119 | BA3B568 | 4.46379 |
| 120 | 225658F | 4.32577 |
| 121 | 73A3F9A | 5.88992 |
| 122 | FB4FB7C | 5.02873 |
| 123 | D2F89B6 | 5.70347 |
| 124 | 4A95D50 | 6.14544 |
| 125 | 1B60346 | 4.75797 |
| 126 | 838D7A0 | 4.66479 |

As can be understood from the foregoing description, the present invention provides pilot symbols to identify the cell IDs and sector IDs using block codes and Walsh codes in an OFDM communication system, thereby increasing the number of cell IDs and sector IDs available and distinguishable in the OFDM communication system. The pilot symbols are generated using not only the block codes and the Walsh codes but also a PAPR reduction sequence, thereby contributing to the overall improvement of a PAPR characteristic of the pilot symbols. In addition, the present invention provides a pilot signal transmission/reception scheme for enabling an OFDM communication system that uses a MIMO scheme and does not require sector identification to distinguish transmission antennas and cell IDs using block codes and Walsh codes, thereby increasing the number of available and distinguishable cell IDs and transmission antennas.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a reference signal to identify a cell and a sector through at least one transmission antenna in a communication system including a plurality of cells each having at least one sector and at least one transmission antenna, wherein a full frequency band is divided into N subcarrier bands, the method comprising the steps of:
generating, by a block code encoder, a block code corresponding to a cell IDentifier (ID) upon receiving the cell ID, wherein each of the plurality of cells is distinguished by its unique cell ID;
selecting, by a Walsh code repeater, a Walsh code corresponding to a sector ID from among predetermined Walsh codes upon receiving the sector ID and repeating the selected Walsh code a set number of times, wherein each of the sectors is distinguished by its unique sector ID;
interleaving, by an interleaver, the block code, and generating, by an adder, a first-part sequence by performing an exclusive OR (XOR) operation on the interleaved block code and the repeated Walsh code;
selecting a second-part sequence corresponding to the cell ID and the sector ID from among predetermined sequences;
generating, by a combiner, a frequency-domain reference signal using the first-part sequence and the second-part sequence; and
converting, by a transmitter, the frequency-domain reference signal into a time-domain reference signal through Inverse Fast Fourier Transform (IFFT), and transmitting the time-domain reference signal over a reference signal transmission period,
wherein a generator matrix for the block code is expressed as $$G = [g_0 g_1 \ldots g_{23}] = \begin{bmatrix} 0101010101010101010101 \\ 0011001100110011001100110011 \\ 0000111100001111000011111 \\ 1111111100000000011111111 \\ 0000000011111111111111111 \\ 1111110010100000100100000 \\ 1111101000000110000001100 \end{bmatrix},$$

wherein the step of converting the frequency-domain reference signal into a time-domain reference signal through IFFT comprises
inserting null data into subcarriers corresponding to an interference cancellation component between a DC component and the subcarriers among the N subcarriers, and performing IFFT after inserting each of elements constituting the frequency-domain reference signal into each of M subcarriers excluding the null data-inserted subcarriers from among the N subcarriers and including an offset, and
wherein the frequency-domain reference signal is defined as $$P_{ID_{cell},n}[k] = \begin{cases} 1 - 2q_{ID_{cell}}[m], & k = N_t m - \frac{N_{used}}{2} + n, m = 0, 1, \ldots, \frac{N_{used}}{N_t} - 1 \\ 0, & \text{otherwise} \end{cases}$$

$$ID_{cell} \in \{0, 1, \ldots, 126\}, n = 0, 1, \ldots, N_t - 1,$$

$$k \in \left\{ -\frac{N_{FFT}}{2}, -\frac{N_{FFT}}{2} + 1, \ldots, \frac{N_{FFT}}{2} - 1 \right\}$$

where $P_{ID_{cell},n}[k]$ denotes the frequency-domain reference signal, $ID_{cell}$ denotes the cell ID, 'n' denotes a transmission antenna ID, 'k' denotes a subcarrier index, $N_{used}$ is the number of subcarriers in use, m is a integer from 0 to $$\frac{N_{used}}{N_t} - 1,$$

$q_{ID_{cell}}[m]$ is a predetermined hexadecimal value corresponding to a cell ID 'm', $N_t$ is the number of transmission antennas, and $N_{FFT}$ is a number of points of an IFFT/FFT block used in an Orthogonal Frequency Division Multiplexing (OFDM) communication system.

2. The method of claim 1, wherein if the number of the sectors is 1, the Walsh code is an all-1 Walsh code.

3. The method of claim 1, wherein the step of converting the frequency-domain reference signal into a time-domain reference signal through IFFT comprises the step of:
inserting null data into subcarriers corresponding to an interference cancellation component between a DC component and the subcarriers among the N subcarriers, and performing IFFT after inserting each of elements constituting the frequency-domain reference signal into each of M subcarriers excluding the null data-inserted subcarriers from among the N subcarriers.

4. The method of claim 1, wherein the offset is set to a different value for each of the cells and the sectors.

5. The method of claim 1, wherein the sequences are set such that a peak-to-average power ratio (PAPR) of the reference signal is minimized.

6. The method of claim 1, wherein $$q_{ID_{cell}}[m] = \begin{cases} R\left(8*\left\lfloor\frac{m}{9}\right\rfloor + m \bmod 9\right), \\ \text{where } m \bmod 9 = 0, 1, \ldots, 7 \; m = 0, 1, \ldots, \frac{N_{used}}{N_t} - 1 \\ T\left(\left\lfloor\frac{m}{9}\right\rfloor\right), \text{where } m \bmod 9 = 8 \end{cases}$$

where $R(r)$ is defined as $$R(r) = b_{ID_{cell}+1} g_{\Pi(r)}, \; r = 8*\left\lfloor\frac{m}{9}\right\rfloor + m \bmod 9 = 0, 1, \ldots, 23,$$

and where $T(s)$ is a predetermined Peak-to-Average Power Ratio (PAPR) reduction sequence that minimizes a PAPR of a pilot symbol corresponding to the cell ID 'm', m is an integer from 0 to $$\frac{N_{used}}{N_t} - 1,$$

wherein $b_k$ represents a row vector and $b_k = \{b_0 b_1 b_2 b_3 b_4 b_5 b_6\}$, where a particular decimal number 'k' ($1 \leq k \leq 127$) is expressed as a binary number of $b_6 b_5 b_4 b_3 b_2 b_1 b_0$, where $b_6$ is a Most Significant Bit (MSB) and $b_0$ is a Least Significant Bit (LSB), wherein $g_u$ represents a $u^{th}$ column vector of a predetermined block code generator matrix, and wherein $\Pi(r)$ is a predetermined interleaving scheme.

7. The method of claim 6, wherein if the number of the transmission antennas is 4 and the number of points for an IFFT/FFT operation used in the communication system is 128, the $\Pi(r)$ is defined as

| $\Pi(r)$ | 11,6,4,9,7,8,0,10,5,1,2,3,17,20,21,14,18,16,23,15,19,22,12,13. |
|---|---|

8. The method of claim 6, wherein the T(k) is expressed as

| ID cell | sequence | papr |
|---|---|---|
| 0 | 0 1 0 | 5.35724 |
| 1 | 0 0 0 | 5.17414 |
| 2 | 1 1 1 | 6.51422 |
| 3 | 0 0 0 | 3.82903 |
| 4 | 1 1 0 | 5.5707 |
| 5 | 1 1 1 | 4.51562 |
| 6 | 1 0 1 | 4.99659 |
| 7 | 1 0 0 | 4.507 |
| 8 | 0 0 0 | 2.77148 |
| 9 | 0 1 1 | 4.52863 |
| 10 | 0 0 1 | 4.77121 |
| 11 | 1 0 0 | 4.59416 |
| 12 | 0 1 0 | 3.78955 |

-continued

| ID cell | sequence | papr |
|---|---|---|
| 13 | 1 0 0 | 4.60896 |
| 14 | 1 0 0 | 4.5935 |
| 15 | 1 0 0 | 4.22853 |
| 16 | 1 0 1 | 4.53933 |
| 17 | 1 0 0 | 4.22832 |
| 18 | 0 1 1 | 4.53739 |
| 19 | 0 0 1 | 4.84545 |
| 20 | 1 0 0 | 5.1608 |
| 21 | 1 1 0 | 6.19203 |
| 22 | 0 0 1 | 4.58568 |
| 23 | 0 1 1 | 5.684 |
| 24 | 0 1 0 | 4.76503 |
| 25 | 0 0 0 | 4.77579 |
| 26 | 0 1 0 | 4.73628 |
| 27 | 1 0 0 | 4.98055 |
| 28 | 0 1 1 | 4.77121 |
| 29 | 1 0 0 | 4.44124 |
| 30 | 0 0 0 | 5.17708 |
| 31 | 0 0 0 | 4.2966 |
| 32 | 1 0 1 | 4.61762 |
| 33 | 1 0 1 | 3.5604 |
| 34 | 0 1 0 | 5.96329 |
| 35 | 0 0 0 | 6.00008 |
| 36 | 0 1 1 | 5.2032 |
| 37 | 0 1 1 | 5.5032 |
| 38 | 1 1 1 | 4.63273 |
| 39 | 0 0 0 | 4.79863 |
| 40 | 1 1 1 | 6.68743 |
| 41 | 1 0 1 | 4.93428 |
| 42 | 1 1 0 | 5.43501 |
| 43 | 1 1 1 | 5.22032 |
| 44 | 0 0 0 | 6.51422 |
| 45 | 1 1 1 | 4.98055 |
| 46 | 0 0 1 | 3.50075 |
| 47 | 0 0 0 | 5.08034 |
| 48 | 0 1 0 | 5.41647 |
| 49 | 1 1 0 | 4.02914 |
| 50 | 0 1 0 | 3.77237 |
| 51 | 1 1 1 | 3.99062 |
| 52 | 0 1 1 | 4.62794 |
| 53 | 1 0 0 | 4.81314 |
| 54 | 0 0 0 | 4.20522 |
| 55 | 1 0 0 | 5.39106 |
| 56 | 0 1 1 | 5.58402 |
| 57 | 1 1 1 | 4.58125 |
| 58 | 0 0 0 | 4.72378 |
| 59 | 0 0 0 | 4.16781 |
| 60 | 0 0 1 | 6.57249 |
| 61 | 1 0 0 | 3.98784 |
| 62 | 0 0 1 | 5.95339 |
| 63 | 1 1 0 | 5.27337 |
| 64 | 0 1 1 | 3.52173 |
| 65 | 0 0 0 | 5.01602 |
| 66 | 0 0 1 | 6.01058 |
| 67 | 0 1 0 | 4.70152 |
| 68 | 0 0 0 | 3.37021 |
| 69 | 0 0 1 | 5.18544 |
| 70 | 1 0 1 | 5.59372 |
| 71 | 1 1 0 | 4.64525 |
| 72 | 0 0 0 | 4.54804 |
| 73 | 1 0 1 | 6.18314 |
| 74 | 0 1 0 | 4.32808 |
| 75 | 0 0 1 | 4.56337 |
| 76 | 0 0 0 | 5.36844 |
| 77 | 0 1 1 | 4.98055 |
| 78 | 0 0 0 | 4.43788 |
| 79 | 1 0 0 | 6.51422 |
| 80 | 1 1 1 | 4.21693 |
| 81 | 0 0 1 | 4.73888 |
| 82 | 1 1 1 | 5.31912 |
| 83 | 0 0 1 | 6.51422 |
| 84 | 0 0 1 | 6.01936 |
| 85 | 1 0 1 | 5.38087 |
| 86 | 1 1 0 | 4.70313 |
| 87 | 0 0 0 | 3.79899 |
| 88 | 1 0 0 | 5.31434 |
| 89 | 1 1 0 | 6.41534 |

-continued

| ID cell | sequence | papr |
|---|---|---|
| 90 | 0 0 1 | 4.11983 |
| 91 | 1 1 0 | 4.18856 |
| 92 | 0 1 0 | 4.81524 |
| 93 | 0 1 0 | 5.0717 |
| 94 | 0 1 0 | 5.05024 |
| 95 | 0 0 0 | 4.77121 |
| 96 | 1 0 0 | 4.18255 |
| 97 | 1 1 0 | 3.49527 |
| 98 | 0 1 0 | 4.47417 |
| 99 | 0 1 1 | 6.09081 |
| 100 | 1 0 1 | 4.2738 |
| 101 | 0 0 1 | 3.77032 |
| 102 | 0 0 0 | 4.79531 |
| 103 | 1 1 0 | 3.80557 |
| 104 | 0 0 1 | 3.67728 |
| 105 | 1 0 0 | 5.55408 |
| 106 | 1 1 1 | 4.96913 |
| 107 | 0 1 1 | 4.52983 |
| 108 | 0 1 1 | 5.0537 |
| 109 | 0 1 1 | 4.67829 |
| 110 | 1 0 1 | 6.11194 |
| 111 | 1 1 0 | 3.53966 |
| 112 | 1 0 0 | 4.49668 |
| 113 | 0 0 0 | 4.44827 |
| 114 | 1 1 1 | 5.4278 |
| 115 | 1 0 0 | 6.33804 |
| 116 | 0 1 0 | 5.31678 |
| 117 | 1 1 0 | 4.77121 |
| 118 | 0 0 1 | 4.9246 |
| 119 | 0 1 0 | 4.46379 |
| 120 | 0 1 1 | 4.32577 |
| 121 | 1 1 1 | 5.88992 |
| 122 | 0 0 0 | 5.02873 |
| 123 | 1 0 1 | 5.70347 |
| 124 | 1 1 0 | 6.14544 |
| 125 | 0 0 1 | 4.75797 |
| 126 | 1 1 0 | 4.66479 | and the $q_{ID_{cell}}[m]$ is expressed as the following hexadecimal numbers

| ID cell | sequence | papr |
|---|---|---|
| 0 | 986D4F4 | 5.35724 |
| 1 | C918AF0 | 5.17414 |
| 2 | 51F5F16 | 6.51422 |
| 3 | 68438DC | 3.82903 |
| 4 | F0AFC38 | 5.5707 |
| 5 | A1DB62F | 4.51562 |
| 6 | 39B62CA | 4.99659 |
| 7 | 6AFF3B0 | 4.507 |
| 8 | F212354 | 2.77148 |
| 9 | A367D42 | 4.52863 |
| 10 | 3B0A9A6 | 4.77121 |
| 11 | 02BCB6C | 4.59416 |
| 12 | 9A51F88 | 3.78955 |
| 13 | CBA419C | 4.60896 |
| 14 | 53C9178 | 4.5935 |
| 15 | 9587BFC | 4.22853 |
| 16 | 0DFAB1A | 4.53933 |
| 17 | 5C9F10C | 4.22832 |
| 18 | C4725FA | 4.53739 |
| 19 | FD44322 | 4.84545 |
| 20 | 65A93C4 | 5.1608 |
| 21 | 34DCDD0 | 6.19203 |
| 22 | AC31936 | 4.58568 |
| 23 | FF78C4F | 5.684 |
| 24 | 6715CA8 | 4.76503 |
| 25 | 36602BC | 4.77579 |
| 26 | AF0D658 | 4.73628 |
| 27 | 97BB090 | 4.98055 |
| 28 | 0F56476 | 4.77121 |
| 29 | 5FA3A60 | 4.44124 |
| 30 | C64FA84 | 5.17708 |
| 31 | 2778120 | 4.2966 |
| 32 | BF951C6 | 4.61762 |
| 33 | FFF0BD2 | 3.5604 |
| 34 | 760DF34 | 5.96329 |
| 35 | 4F3B9FC | 6.00008 |
| 36 | D756D1A | 5.2032 |
| 37 | 862370F | 5.5032 |
| 38 | 1FCF7FA | 4.63273 |
| 39 | 4D07290 | 4.79863 |
| 40 | D5FA676 | 6.68743 |
| 41 | 849F862 | 4.93428 |
| 42 | 1CF2C84 | 5.43501 |
| 43 | 25C4F4F | 5.22032 |
| 44 | BD29AA8 | 6.51422 |
| 45 | FCDC4BF | 4.98055 |
| 46 | 743105A | 3.50075 |
| 47 | B27FADC | 5.08034 |
| 48 | 2A12F38 | 5.41647 |
| 49 | 7BF742C | 4.02914 |
| 50 | F30A4C8 | 3.77237 |
| 51 | DABC602 | 3.99062 |
| 52 | 42516F6 | 4.62794 |
| 53 | 13A48F0 | 4.81314 |
| 54 | 8B49814 | 4.20522 |
| 55 | D88096C | 5.39106 |
| 56 | 406DD8A | 5.58402 |
| 57 | 119879F | 4.58125 |
| 58 | 8975378 | 4.72378 |
| 59 | B0431B0 | 4.16781 |
| 60 | 282F156 | 6.57249 |
| 61 | 79DBB40 | 3.98784 |
| 62 | F136BA6 | 5.95339 |
| 63 | 62BBC04 | 5.27337 |
| 64 | FA56CF2 | 3.52173 |
| 65 | AB232F4 | 5.01602 |
| 66 | 334F212 | 6.01058 |
| 67 | 0A784D8 | 4.70152 |
| 68 | 921503C | 3.37021 |
| 69 | C360A2A | 5.18544 |
| 70 | 5B8DACF | 5.59372 |
| 71 | 08C4FB4 | 4.64525 |
| 72 | 9029B50 | 4.54804 |
| 73 | C1DC146 | 6.18314 |
| 74 | 59315A0 | 4.32808 |
| 75 | 600736A | 4.56337 |
| 76 | F86A38C | 5.36844 |
| 77 | A91FD9A | 4.98055 |
| 78 | 317297C | 4.43788 |
| 79 | F7BC3F8 | 6.51422 |
| 80 | 6FD171F | 4.21693 |
| 81 | 3F2490A | 4.73888 |
| 82 | A6C9DFF | 5.31912 |
| 83 | 9F7FB26 | 6.51422 |
| 84 | 0712BC2 | 6.01936 |
| 85 | 56F71D6 | 5.38087 |
| 86 | CF8A530 | 4.70313 |
| 87 | 9D43048 | 3.79899 |
| 88 | 05AF0AC | 5.31434 |
| 89 | 54DBFB8 | 6.41534 |
| 90 | CC36A5F | 4.11983 |
| 91 | F580C94 | 4.18856 |
| 92 | 6D6DC70 | 4.81524 |
| 93 | 3C18664 | 5.0717 |
| 94 | A475680 | 5.05024 |
| 95 | 4543924 | 4.77121 |
| 96 | DDAF9C0 | 4.18255 |
| 97 | 8CDB7D4 | 3.49527 |
| 98 | 1436730 | 4.47417 |
| 99 | 2D005FA | 6.09081 |
| 100 | B5FD11F | 4.2738 |
| 101 | F418B0A | 3.77032 |
| 102 | 7C75BFC | 4.79531 |
| 103 | 2FBCF94 | 3.80557 |
| 104 | B751A72 | 3.67728 |
| 105 | F6A4064 | 5.55408 |
| 106 | 7FC9482 | 4.96913 |

-continued

| ID cell | sequence | papr |
|---------|----------|------|
| 107 | 477F64A | 4.52983 |
| 108 | DF126AF | 5.0537 |
| 109 | 8F67CBA | 4.67829 |
| 110 | 168A85F | 6.11194 |
| 111 | D0C46D8 | 3.53966 |
| 112 | 48A923C | 4.49668 |
| 113 | 195C828 | 4.44827 |
| 114 | 81B1CCF | 5.4278 |
| 115 | B887A04 | 6.33804 |
| 116 | 206AFF0 | 5.31678 |
| 117 | 719F4F4 | 4.77121 |
| 118 | F972012 | 4.9246 |
| 119 | BA3B568 | 4.46379 |
| 120 | 225658F | 4.32577 |
| 121 | 73A3F9A | 5.88992 |
| 122 | FB4FB7C | 5.02873 |
| 123 | D2F89B6 | 5.70347 |
| 124 | 4A95D50 | 6.14544 |
| 125 | 1B60346 | 4.75797 |
| 126 | 838D7A0 | 4.66479. |

9. An apparatus for transmitting a reference signal to identify a cell and a sector through at least one transmission antenna in a communication system including a plurality of cells each having at least one sector and at least one transmission antenna, wherein a full frequency band is divided into N subcarrier bands, the apparatus comprising:
   a block code encoder for generating a block code corresponding to a cell identifier (ID) upon receiving the cell ID, wherein each of the plurality of cells is distinguished by its unique cell ID;
   a Walsh code repeater for selecting a Walsh code corresponding to a sector ID from among predetermined Walsh codes upon receiving the sector ID and repeating the selected Walsh code a predetermined number of times, wherein each of the sectors is distinguished by its unique sector ID;
   an interleaver for interleaving the block code;
   an adder for generating a first-part sequence by performing an exclusive OR (XOR) operation on the interleaved block code and the repeated Walsh code;
   a combiner for generating a frequency-domain reference signal using the first-part sequence and a second-part sequence selected according to the cell ID and the sector ID from among predetermined sequences; and
   a transmitter for converting the frequency-domain reference signal into a time-domain reference signal through inverse fast Fourier transform (IFFT), and transmitting the time-domain reference signal over a predetermined reference signal transmission period,
   wherein a generator matrix for the block code is expressed as $$G = [g_0 g_1 \ldots g_{23}] = \begin{bmatrix} 0101010101010101010101 \\ 0011001100110011001100 11 \\ 000011110000111100001111 \\ 111111110000000011111111 \\ 000000001111111111111111 \\ 111111001010000010010000 \\ 111110100000011000001100 \end{bmatrix},$$

wherein the sequences are set such that a peak-to-average power ratio (PAPR) of the reference signal is minimized, and wherein the frequency-domain reference signal is defined as $$P_{ID_{cell},n}[k] = \begin{cases} 1 - 2q_{ID_{cell}}[m], & k = N_t m - \frac{N_{used}}{2} + n, \, m = 0, 1, \ldots, \frac{N_{used}}{N_t} - 1 \\ 0, & \text{otherwise} \end{cases}$$

$ID_{cell} \in \{0, 1, \ldots, 126\}, n = 0, 1, \ldots, N_t - 1,$ $$k \in \left\{-\frac{N_{FFT}}{2}, -\frac{N_{FFT}}{2} + 1, \ldots, \frac{N_{FFT}}{2} - 1\right\}$$

where $P_{ID_{cell},n}[k]$ denotes the frequency-domain reference signal, $ID_{cell}$ denotes the cell ID, 'n' denotes a transmission antenna ID, 'k' denotes a subcarrier index, $N_{used}$ is the number of subcarriers in use, m is an integer from 0 to $$\frac{N_{used}}{N_t} - 1,$$

$Q_{ID_{cell}}[m]$ is a predetermined hexadecimal value corresponding to a cell ID 'm', $N_t$ is the number of transmission antennas, and $N_{IFFT}$ is a number of points of an IFFT/FFT block used in an Orthogonal Frequency Division Multiplexing (OFDM) communication system.

10. The apparatus of claim 9, wherein if the number of the sectors is 1, the Walsh code is an all-1 Walsh code.

11. The apparatus of claim 9, wherein the transmitter comprises:
   an IFFT block for inserting null data into subcarriers corresponding to an interference cancellation component between a DC component and the subcarriers among the N subcarriers, and performing IFFT after inserting each of elements constituting the frequency-domain reference signal into each of M subcarriers excluding the null data-inserted subcarriers from among the N subcarriers; and
   a radio frequency (RF) processor for RF-processing the IFFT-processed signal and transmitting RF-processed signal.

12. The apparatus of claim 9, wherein the transmitter comprises:
   an IFFT block for inserting null data into subcarriers corresponding to an interference cancellation component between a DC component and the subcarriers among the N subcarriers, and performing IFFT after inserting each of elements constituting the frequency-domain reference signal into each of M subcarriers excluding the null data-inserted subcarriers from among the N subcarriers and including an offset; and
   a radio frequency (RF) processor for RF-processing the IFFT-processed signal and transmitting RF-processed signal.

13. The apparatus of claim 12, wherein the offset is set to a different value for each of the cells and the sectors.

14. The apparatus of claim 9, wherein $$q_{ID_{cell}}[m] = \begin{cases} R\left(8*\left\lfloor\frac{m}{9}\right\rfloor + m \bmod 9\right), \\ \text{where } m \bmod 9 = 0, 1, \ldots, 7 \; m = 0, 1, \ldots, \frac{N_{used}}{N_t} - 1 \\ T\left(\left\lfloor\frac{m}{9}\right\rfloor\right), \text{ where } m \bmod 9 = 8 \end{cases}$$

where R(r) is defined as $$R(r) = b_{ID_{cell}+1} g_{\Pi(r)}, r = 8*\left\lfloor\frac{m}{9}\right\rfloor + m \bmod 9 = 0, 1, \ldots, 23,$$

where T(s) is a predetermined Peak-to-Average Power Ratio (PAPR) reduction sequence that minimizes a PAPR of a pilot symbol corresponding to the cell ID 'm', m is an integer from 0 to $$\frac{N_{used}}{N_t} - 1,$$

wherein $b_k$ represents a row vector and $b_k = \{b_0 b_1 b_2 b_3 b_4 b_5 b_6\}$, where a particular decimal number 'k' ($1 \leq k \leq 127$) is expressed as a binary number of $b_6 b_5 b_4 b_3 b_2 b_1 b_0$, where $b_6$ is a Most Significant Bit (MSB) and $b_0$ is a Least Significant Bit (LSB), wherein $g_u$ represents a $u^{th}$ column vector of a predetermined block code generator matrix, and wherein $\Pi(r)$ is a predetermined interleaving scheme.

15. The apparatus of claim 14, wherein if the number of the transmission antennas is 4 and the number of points for an IFFT/FFT operation used in the communication system is 128, the $\Pi(r)$ is defined as

| $\Pi(r)$ | 11,6,4,9,7,8,0,10,5,1,2,3,17,20,21,14,18,16,23,15,19,22,12,13. |
| --- | --- |

16. The apparatus of claim 15, wherein the T(k) is expressed as

| ID cell | sequence | papr |
| --- | --- | --- |
| 0 | 0 1 0 | 5.35724 |
| 1 | 0 0 0 | 5.17414 |
| 2 | 1 1 1 | 6.51422 |
| 3 | 0 0 0 | 3.82903 |
| 4 | 1 1 0 | 5.5707 |
| 5 | 1 1 1 | 4.51562 |
| 6 | 1 0 1 | 4.99659 |
| 7 | 1 0 0 | 4.507 |
| 8 | 0 0 0 | 2.77148 |
| 9 | 0 1 1 | 4.52863 |
| 10 | 0 0 1 | 4.77121 |
| 11 | 1 0 0 | 4.59416 |
| 12 | 0 1 0 | 3.78955 |
| 13 | 1 0 0 | 4.60896 |
| 14 | 1 0 0 | 4.5935 |
| 15 | 1 0 0 | 4.22853 |
| 16 | 1 0 1 | 4.53933 |
| 17 | 1 0 0 | 4.22832 |
| 18 | 0 1 1 | 4.53739 |
| 19 | 0 0 1 | 4.84545 |
| 20 | 1 0 0 | 5.1608 |
| 21 | 1 1 0 | 6.19203 |
| 22 | 0 0 1 | 4.58568 |
| 23 | 0 1 1 | 5.684 |
| 24 | 0 1 0 | 4.76503 |
| 25 | 0 0 0 | 4.77579 |
| 26 | 0 1 0 | 4.73628 |
| 27 | 1 0 0 | 4.98055 |
| 28 | 0 1 1 | 4.77121 |
| 29 | 1 0 0 | 4.44124 |
| 30 | 0 0 0 | 5.17708 |
| 31 | 0 0 0 | 4.2966 |
| 32 | 1 0 1 | 4.61762 |
| 33 | 1 0 1 | 3.5604 |
| 34 | 0 1 0 | 5.96329 |
| 35 | 0 0 0 | 6.00008 |
| 36 | 0 1 1 | 5.2032 |
| 37 | 0 1 1 | 5.5032 |
| 38 | 1 1 1 | 4.63273 |
| 39 | 0 0 0 | 4.79863 |
| 40 | 1 1 1 | 6.68743 |
| 41 | 1 0 1 | 4.93428 |
| 42 | 1 1 0 | 5.43501 |
| 43 | 1 1 1 | 5.22032 |
| 44 | 0 0 0 | 6.51422 |
| 45 | 1 1 1 | 4.98055 |
| 46 | 0 0 1 | 3.50075 |
| 47 | 0 0 0 | 5.08034 |
| 48 | 0 1 0 | 5.41647 |
| 49 | 1 1 0 | 4.02914 |
| 50 | 0 1 0 | 3.77237 |
| 51 | 1 1 1 | 3.99062 |
| 52 | 0 1 1 | 4.62794 |
| 53 | 1 0 0 | 4.81314 |
| 54 | 0 0 0 | 4.20522 |
| 55 | 1 0 0 | 5.39106 |
| 56 | 0 1 1 | 5.58402 |
| 57 | 1 1 1 | 4.58125 |
| 58 | 0 0 0 | 4.72378 |
| 59 | 0 0 0 | 4.16781 |
| 60 | 0 0 1 | 6.57249 |
| 61 | 1 0 0 | 3.98784 |
| 62 | 0 0 1 | 5.95339 |
| 63 | 1 1 0 | 5.27337 |
| 64 | 0 1 1 | 3.52173 |
| 65 | 0 0 0 | 5.01602 |
| 66 | 0 0 1 | 6.01058 |
| 67 | 0 1 0 | 4.70152 |
| 68 | 0 0 0 | 3.37021 |
| 69 | 0 0 1 | 5.18544 |
| 70 | 1 0 1 | 5.59372 |
| 71 | 1 1 0 | 4.64525 |
| 72 | 0 0 0 | 4.54804 |
| 73 | 1 0 1 | 6.18314 |
| 74 | 0 1 0 | 4.32808 |
| 75 | 0 0 1 | 4.56337 |
| 76 | 0 0 0 | 5.36844 |
| 77 | 0 1 1 | 4.98055 |
| 78 | 0 0 0 | 4.43788 |
| 79 | 1 0 0 | 6.51422 |
| 80 | 1 1 1 | 4.21693 |
| 81 | 0 0 1 | 4.73888 |
| 82 | 1 1 1 | 5.31912 |
| 83 | 0 0 1 | 6.51422 |
| 84 | 0 0 1 | 6.01936 |
| 85 | 1 0 1 | 5.38087 |
| 86 | 1 1 0 | 4.70313 |
| 87 | 0 0 0 | 3.79899 |
| 88 | 1 0 0 | 5.31434 |
| 89 | 1 1 0 | 6.41534 |
| 90 | 0 0 1 | 4.11983 |
| 91 | 1 1 0 | 4.18856 |
| 92 | 0 1 0 | 4.81524 |
| 93 | 0 1 0 | 5.0717 |
| 94 | 0 1 0 | 5.05024 |
| 95 | 0 0 0 | 4.77121 |
| 96 | 1 0 0 | 4.18255 |
| 97 | 1 1 0 | 3.49527 |
| 98 | 0 1 0 | 4.47417 |

-continued

| ID cell | sequence | papr |
|---|---|---|
| 99 | 0 1 1 | 6.09081 |
| 100 | 1 0 1 | 4.2738 |
| 101 | 0 0 1 | 3.77032 |
| 102 | 0 0 0 | 4.79531 |
| 103 | 1 1 0 | 3.80557 |
| 104 | 0 0 1 | 3.67728 |
| 105 | 1 0 0 | 5.55408 |
| 106 | 1 1 1 | 4.96913 |
| 107 | 0 1 1 | 4.52983 |
| 108 | 0 1 1 | 5.0537 |
| 109 | 0 1 1 | 4.67829 |
| 110 | 1 0 1 | 6.11194 |
| 111 | 1 1 0 | 3.53966 |
| 112 | 1 0 0 | 4.49668 |
| 113 | 0 0 0 | 4.44827 |
| 114 | 1 1 1 | 5.4278 |
| 115 | 1 0 0 | 6.33804 |
| 116 | 0 1 0 | 5.31678 |
| 117 | 1 1 0 | 4.77121 |
| 118 | 0 0 1 | 4.9246 |
| 119 | 0 1 0 | 4.46379 |
| 120 | 0 1 1 | 4.32577 |
| 121 | 1 1 1 | 5.88992 |
| 122 | 0 0 0 | 5.02873 |
| 123 | 1 0 1 | 5.70347 |
| 124 | 1 1 0 | 6.14544 |
| 125 | 0 0 1 | 4.75797 |
| 126 | 1 1 0 | 4.66479 | and the $q_{ID_{cell}}[m]$ is expressed as the following hexadecimal numbers

| ID cell | sequence | papr |
|---|---|---|
| 0 | 986D4F4 | 5.35724 |
| 1 | C918AF0 | 5.17414 |
| 2 | 51F5F16 | 6.51422 |
| 3 | 68438DC | 3.82903 |
| 4 | F0AFC38 | 5.5707 |
| 5 | A1DB62F | 4.51562 |
| 6 | 39B62CA | 4.99659 |
| 7 | 6AFF3B0 | 4.507 |
| 8 | F212354 | 2.77148 |
| 9 | A367D42 | 4.52863 |
| 10 | 3B0A9A6 | 4.77121 |
| 11 | 02BCB6C | 4.59416 |
| 12 | 9A51F88 | 3.78955 |
| 13 | CBA419C | 4.60896 |
| 14 | 53C9178 | 4.5935 |
| 15 | 9587BFC | 4.22853 |
| 16 | 0DFAB1A | 4.53933 |
| 17 | 5C9F10C | 4.22832 |
| 18 | C4725FA | 4.53739 |
| 19 | FD44322 | 4.84545 |
| 20 | 65A93C4 | 5.1608 |
| 21 | 34DCDD0 | 6.19203 |
| 22 | AC31936 | 4.58568 |
| 23 | FF78C4F | 5.684 |
| 24 | 6715CA8 | 4.76503 |
| 25 | 36602BC | 4.77579 |
| 26 | AF0D658 | 4.73628 |
| 27 | 97BB090 | 4.98055 |
| 28 | 0F56476 | 4.77121 |
| 29 | 5FA3A60 | 4.44124 |
| 30 | C64FA84 | 5.17708 |
| 31 | 2778120 | 4.2966 |
| 32 | BF951C6 | 4.61762 |
| 33 | FFF0BD2 | 3.5604 |
| 34 | 760DF34 | 5.96329 |
| 35 | 4F3B9FC | 6.00008 |
| 36 | D756D1A | 5.2032 |
| 37 | 862370F | 5.5032 |
| 38 | 1FCF7FA | 4.63273 |
| 39 | 4D07290 | 4.79863 |
| 40 | D5FA676 | 6.68743 |
| 41 | 849F862 | 4.93428 |
| 42 | 1CF2C84 | 5.43501 |
| 43 | 25C4F4F | 5.22032 |
| 44 | BD29AA8 | 6.51422 |
| 45 | FCDC4BF | 4.98055 |
| 46 | 743105A | 3.50075 |
| 47 | B27FADC | 5.08034 |
| 48 | 2A12F38 | 5.41647 |
| 49 | 7BF742C | 4.02914 |
| 50 | F30A4C8 | 3.77237 |
| 51 | DABC602 | 3.99062 |
| 52 | 42516F6 | 4.62794 |
| 53 | 13A48F0 | 4.81314 |
| 54 | 8B49814 | 4.20522 |
| 55 | D88096C | 5.39106 |
| 56 | 406DD8A | 5.58402 |
| 57 | 119879F | 4.58125 |
| 58 | 8975378 | 4.72378 |
| 59 | B0431B0 | 4.16781 |
| 60 | 282F156 | 6.57249 |
| 61 | 79DBB40 | 3.98784 |
| 62 | F136BA6 | 5.95339 |
| 63 | 62BBC04 | 5.27337 |
| 64 | FA56CF2 | 3.52173 |
| 65 | AB232F4 | 5.01602 |
| 66 | 334F212 | 6.01058 |
| 67 | 0A784D8 | 4.70152 |
| 68 | 921503C | 3.37021 |
| 69 | C360A2A | 5.18544 |
| 70 | 5B8DACF | 5.59372 |
| 71 | 08C4FB4 | 4.64525 |
| 72 | 9029B50 | 4.54804 |
| 73 | C1DC146 | 6.18314 |
| 74 | 59315A0 | 4.32808 |
| 75 | 600736A | 4.56337 |
| 76 | F86A38C | 5.36844 |
| 77 | A91FD9A | 4.98055 |
| 78 | 317297C | 4.43788 |
| 79 | F7BC3F8 | 6.51422 |
| 80 | 6FD171F | 4.21693 |
| 81 | 3F2490A | 4.73888 |
| 82 | A6C9DFF | 5.31912 |
| 83 | 9F7FB26 | 6.51422 |
| 84 | 0712BC2 | 6.01936 |
| 85 | 56F71D6 | 5.38087 |
| 86 | CF8A530 | 4.70313 |
| 87 | 9D43048 | 3.79899 |
| 88 | 05AF0AC | 5.31434 |
| 89 | 54DBFB8 | 6.41534 |
| 90 | CC36A5F | 4.11983 |
| 91 | F580C94 | 4.18856 |
| 92 | 6D6DC70 | 4.81524 |
| 93 | 3C18664 | 5.0717 |
| 94 | A475680 | 5.05024 |
| 95 | 4543924 | 4.77121 |
| 96 | DDAF9C0 | 4.18255 |
| 97 | 8CDB7D4 | 3.49527 |
| 98 | 1436730 | 4.47417 |
| 99 | 2D005FA | 6.09081 |
| 100 | B5FD11F | 4.2738 |
| 101 | F418B0A | 3.77032 |
| 102 | 7C75BFC | 4.79531 |
| 103 | 2FBCF94 | 3.80557 |
| 104 | B751A72 | 3.67728 |
| 105 | F6A4064 | 5.55408 |
| 106 | 7FC9482 | 4.96913 |
| 107 | 477F64A | 4.52983 |
| 108 | DF126AF | 5.0537 |
| 109 | 8F67CBA | 4.67829 |
| 110 | 168A85F | 6.11194 |
| 111 | D0C46D8 | 3.53966 |
| 112 | 48A923C | 4.49668 |
| 113 | 195C828 | 4.44827 |
| 114 | 81B1CCF | 5.4278 |
| 115 | B887A04 | 6.33804 |

-continued

| ID cell | sequence | papr |
| --- | --- | --- |
| 116 | 206AFF0 | 5.31678 |
| 117 | 719F4F4 | 4.77121 |
| 118 | F972012 | 4.9246 |
| 119 | BA3B568 | 4.46379 |
| 120 | 225658F | 4.32577 |
| 121 | 73A3F9A | 5.88992 |
| 122 | FB4FB7C | 5.02873 |
| 123 | D2F89B6 | 5.70347 |
| 124 | 4A95D50 | 6.14544 |
| 125 | 1B60346 | 4.75797 |
| 126 | 838D7A0 | 4.66479. |

17. A method for providing a pilot symbol for base station identification in a Multiple-Input Multiple-Output (MIMO) communication system having one or more transmission antennas, the method comprising:

determining, by a pilot signal generator, the pilot signal; and transmitting, by an antenna, the determined pilot signal, wherein the pilot symbol is comprised of a first sequence having a good cell identification characteristic and a second sequence for reducing a peak-to-average power ratio (PAPR) for all pilot symbols, and wherein the pilot symbol is determined by the following equation in which the first sequence and the second sequence are reflected, $$q_{ID_{cell}}[m] = \begin{cases} R\left(8*\left\lfloor \frac{m}{9} \right\rfloor + m \bmod 9\right), \\ \text{where } m \bmod 9 = 0, 1, \ldots, 7\; m = 0, 1, \ldots, \frac{N_{used}}{N_t} - 1 \\ T\left(\left\lfloor \frac{m}{9} \right\rfloor\right), \text{where } m \bmod 9 = 8 \end{cases}$$

where R(r) is defined as $$R(r) = b_{ID_{cell}+1} g_{\Pi(r)},\; r = 8*\left\lfloor \frac{m}{9} \right\rfloor + m \bmod 9 = 0, 1, \ldots, 23$$

where R(r) denotes the first sequence, and T(−) denotes the second sequence, $q_{ID_{cell}}[m]$ is a predetermined hexadecimal value corresponding to a cell ID 'm', $N_t$ is the number of transmission antennas, m is an integer from 0 to $$\frac{N_{used}}{N_t} - 1,$$

$b_k$ represents a row vector and $b_k = \{b_0 b_1 b_2 b_3 b_4 b_5 b_6\}$, where a particular decimal number 'k' ($1 \leq k \leq 127$) is expressed as a binary number of $b_6 b_5 b_4 b_3 b_2 b_1 b_0$, where $b_6$ is a Most Significant Bit (MSB) and $b_0$ is a Least Significant Bit (LSB), wherein $g_u$ represents a $u^{th}$ column vector of a predetermined block code generator matrix, and wherein $\Pi(r)$ is a predetermined interleaving scheme.

18. The method of claim 17, wherein the first sequence is created by block-coding information to be transmitted from a base station to a mobile station.

19. The method of claim 18, wherein the information to be transmitted from the base station to the mobile station is a cell IDentifier(ID).

20. The method of claim 17, wherein the second sequence is created from a predetermined reference table taking the first sequence into account.

21. The method of claim 17, wherein the pilot symbol for base station identification, independently transmitted from each of $N_t$ transmission antennas, is determined by $$P_{ID_{cell},n}[k] = \begin{cases} 1 - 2q_{ID_{cell}}[m],\; k = N_t m - \frac{N_{used}}{2} + n,\; m = 0, 1, \ldots, \frac{N_{used}}{N_t} - 1 \\ 0,\; \text{otherwise} \end{cases}$$

$ID_{cell} \in \{0, 1, \ldots, 126\},\; n = 0, 1, \ldots, N_t - 1,$ $$k \in \left\{ -\frac{N_{FFT}}{2},\; -\frac{N_{FFT}}{2}+1,\; \ldots,\; \frac{N_{FFT}}{2}-1 \right\}$$

$P_{ID_{cell},n}[k]$ denotes the frequency-domain reference signal, $ID_{cell}$ denotes the cell ID, 'n' denotes a transmission antenna ID, 'k' denotes a subcarrier index, $N_{used}$ is the number of subcarriers in use, m is an integer from 0 to $$\frac{N_{used}}{N_t} - 1,$$

$q_{ID_{cell}}[m]$ is a predetermined hexadecimal value corresponding to the cell ID 'm', $N_t$ is the number of transmission antennas, and $N_{FFT}$ is a number of points of an IFFT/FFT block used in an Orthogonal Frequency Division Multiplexing (OFDM) communication system.

* * * * *

UNITED STATES PATENT AND TRADEMARK OFFICE
CERTIFICATE OF CORRECTION

PATENT NO. : 7,586,836 B2  Page 1 of 1
APPLICATION NO. : 11/165719
DATED : September 8, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this

Twenty-first Day of September, 2010

David J. Kappos
*Director of the United States Patent and Trademark Office*